United States Patent
Geiger et al.

(10) Patent No.: US 7,089,391 B2
(45) Date of Patent: *Aug. 8, 2006

(54) MANAGING A CODEC ENGINE FOR MEMORY COMPRESSION/DECOMPRESSION OPERATIONS USING A DATA MOVEMENT ENGINE

(75) Inventors: Peter D. Geiger, Austin, TX (US); Manuel J. Alvarez, II, Austin, TX (US); Thomas A. Dye, Austin, TX (US)

(73) Assignee: Quickshift, Inc., Austin, TX (US)

(*) Notice: Subject to any disclaimer, the term of this patent is extended or adjusted under 35 U.S.C. 154(b) by 406 days.

This patent is subject to a terminal disclaimer.

(21) Appl. No.: 10/227,607

(22) Filed: Aug. 23, 2002

(65) Prior Publication Data

US 2003/0061457 A1 Mar. 27, 2003

Related U.S. Application Data

(60) Provisional application No. 60/314,538, filed on Aug. 23, 2001.

(51) Int. Cl.
*G06F 12/02* (2006.01)

(52) U.S. Cl. .................. 711/170; 709/247
(58) Field of Classification Search ............ 711/104, 711/105, 154, 165, 170; 709/247
See application file for complete search history.

(56) References Cited

U.S. PATENT DOCUMENTS

| | | | | |
|---|---|---|---|---|
| 5,440,718 A | * | 8/1995 | Kumagai et al. ........... | 711/154 |
| 5,974,471 A | * | 10/1999 | Belt ........................... | 710/1 |
| 6,002,411 A | | 12/1999 | Dye | |
| 6,173,381 B1 | | 1/2001 | Dye | |
| 6,208,273 B1 | | 3/2001 | Dye | |
| 6,263,413 B1 | * | 7/2001 | Motomura et al. ......... | 711/173 |
| 6,523,102 B1 | | 2/2003 | Dye | |
| 6,822,589 B1 | | 11/2004 | Dye | |

OTHER PUBLICATIONS

U.S. Appl. No. 08/916,464, filed Aug. 8, 1997, Dye.
U.S. Appl. No. 09/491,343, Jan. 26, 2000, Dye.

* cited by examiner

*Primary Examiner*—Kevin L. Ellis
(74) *Attorney, Agent, or Firm*—Michael P. Adams; Winstead Sechrest & Minick P.C.

(57) ABSTRACT

A system and method for managing a functional unit in a system using a data movement engine. An exemplary system may comprise a CPU coupled to a memory controller. The memory controller may include or couple to a data movement engine (DME). The memory controller may in turn couple to a system memory or other device which includes at least one functional unit. The DME may operate to transfer data to/from the system memory and/or the functional unit, as described herein. In one embodiment, the DME may also include multiple DME channels or multiple DME contexts. The DME may operate to direct the functional unit to perform operations on data in the system memory. For example, the DME may read source data from the system memory, the DME may then write the source data to the functional unit, the functional unit may operate on the data to produce modified data, the DME may then read the modified data from the functional unit, and the DME may then write the modified data to a destination in the system memory. Thus the DME may direct the functional unit to perform an operation on data in system memory using four data movement operations. The DME may also perform various other data movement operations in the computer system, e.g., data movement operations that are not involved with operation of the functional unit.

63 Claims, 20 Drawing Sheets

Compress and store in CC in system memory

Compress and store in CC in system memory

Compress and store to disk

MANAGING A CODEC ENGINE FOR MEMORY COMPRESSION/DECOMPRESSION OPERATIONS USING A DATA MOVEMENT ENGINE

PRIORITY DATA

This application claims benefit of priority of U.S. provisional patent application Ser. No. 60/314,538 titled "System and Method for Managing a Codec Engine for Memory Compression/Decompression Operations Using a Data Movement Engine" and filed on Aug. 23, 2001.

CONTINUATION DATA

This application is a continuation-in-part of U.S. patent application Ser. No. 09/550,380 titled "Parallel Compression/Decompression System and Method for Implementation of In-Memory Compressed Cache Improving Storage Density and Access Speed for Industry Standard Memory Subsystems and In-Line Memory Modules" filed on Apr. 14, 2000, which is hereby incorporated by reference in its entirety as though fully and completely set forth herein.

FIELD OF THE INVENTION

The present invention relates to computer systems and/or memory systems, and more particularly to a system which uses a data movement engine (DME) to manage a compression/decompression (codec) engine, wherein the codec engine may be embedded on industry standard memory modules, in a memory controller, or other computer system components. The present invention further relates to a system which includes a data movement engine (DME) to manage a functional unit in a memory system, e.g., comprised on a memory module.

DESCRIPTION OF THE RELATED ART

System memory architectures and modules have remained relatively unchanged for many years. While memory density has increased and the cost per storage bit has decreased over time, there has not been a significant improvement to the effective operation of the memory subsystem using non-memory devices located within such memory subsystems. The majority of computing systems presently use industry standard in-line modules. These modules house multiple DRAM memory devices for easy upgrade, configuration, and improved density per area.

Software-implemented compression and decompression technologies have also been used to reduce the size of data stored on the disk subsystem or in the system memory data. Current compressed data storage implementations use the system's CPU executing a software program to compress information for storage on disk. However, a software solution typically uses too many CPU compute cycles to operate both compression and decompression in the present application(s). This compute cycle problem increases as applications increase in size and complexity. In addition, there has been no general-purpose use of compression and decompression for in-memory system data. Prior art systems have been specific to certain data types. Thus, software compression has been used, but this technique limits CPU performance and has restricted use to certain data types.

Similar problems exist for programs that require multiple applications of software threads to operate in parallel. Software compression does not address heavy loaded or multi-threaded applications, which require high CPU throughput.

Other hardware compression solutions have not focused on "in-memory" data (data which reside in the active portion of the memory and software hierarchy). These solutions have typically been I/O data compression devices located away from the system memory or memory subsystem. In addition, the usage of hardware compression has been restricted to slow, serial input and output devices usually located at the I/O subsystem.

Mainframe computers have used data compression for acceleration and reduction of storage space for years. These systems require high dollar compression modules located away from the system memory and do not compress in-memory data in the same memory subsystem for improved performance. Such high dollar compression subsystems use multiple separate engines running in parallel to achieve compression speeds at super computer rates. Multiple separate, serial compression and decompression engines running in parallel are cost prohibitive for general use servers, workstations, desktops, or mobile units. Lower cost semiconductor devices have been developed that use compression hardware as well. The main difference is that these devices do not operate fast enough to run at memory speed and thus lack the necessary performance for in-memory data. Such compression hardware devices are limited to serial operation at compression rates that work for slow I/O devices such as tape backup units. The problem with such I/O compression devices, other than tape backup units, is that portions of the data to compress are often too small of a block size to effectively see the benefits of compression. This is especially true in disk and network subsystems. To operate hardware compression on in-memory data at memory bus speeds requires over an order of magnitude more speed than present day state-of-the-art compression hardware.

Prior Art Computer System Architecture

FIG. 1 illustrates a block diagram example of a prior art computer hardware and software operating system hierarchy of present day computing systems. The prior art memory and data storage hierarchy comprises the CPU Subsystem 100, the main memory subsystem 200, and the disk subsystem 300. The CPU subsystem 100 comprises the L1 cache memory 120 and L2 cache memory 130 coupled to the CPU 110 and the CPU's local bus 135. The CPU subsystem 100 is coupled to the main memory subsystem 200 through the CPU local bus 135. The main memory subsystem 200 is also coupled to the disk subsystem 300. The main memory subsystem 200 comprises the memory controller 210, for controlling the main system memory banks, active pages of memory 220, inactive pages of memory 230, and a dynamically defined page fault boundary 232. The page fault boundary 232 is dynamically controlled by the virtual memory manager software 620 to optimize the balance between active and inactive pages in the system memory and "stale" pages stored on disk. The memory subsystem 200 is coupled to the I/O, or disk subsystem 300, by the I/O peripheral bus interface 235, which may be one of multiple bus standards or server/workstation proprietary I/O bus interfaces, e.g., the PCI bus. For purpose of illustration, the I/O disk subsystem 300 comprises the disk controller 310, the optional disk cache memory 320, and the actual physical hard disk or disk array 330 which is used to store nonvolatile/non-active pages. In alternate embodiments, multiple subsections of CPU 100, memory 200, and disk 300 subsystems may be used for larger capacity and/or faster operation.

The prior art drawing of FIG. 1 also illustrates the software operating system 600. The typical operating system (OS) comprises multiple blocks. FIG. 1 shows a few of the relevant OS blocks, including the virtual memory manager (VMM) 620, file system 640, and disk drivers 660.

The operation of prior art systems for storage and retrieval of active and non-active pages from either the system memory or the disk is now described for reference. Again referring to the prior art system of FIG. 1, the VMM 620 is responsible for allocation of active pages and reallocation of inactive pages. The VMM 620 defines page fault boundaries 232 separating the active pages 220 and the inactive pages 230 located in both the system memory subsystem 200 and disk subsystem 300. An active page may be defined as an area or page of memory, typically 4096 bytes, which is actively used by the CPU during application execution. Active pages reside between or within system memory or CPU cache memory. An inactive page may be defined as an area or page of memory, typically 4096 bytes, which is not directly accessed by the CPU for application execution. Inactive pages may reside in the system memory, or may be stored locally or on networks on storage media such as disks. The page fault boundary 232 is dynamically allocated during run time operation to provide the best performance and operation as defined by many industry standard algorithms such as the LRU/LFU lazy replacement algorithm for page swapping to disk. As applications grow, consuming more system memory than the actual available memory space, the page fault boundaries 232 are redefined to store more inactive pages 230 in the disk subsystem 300 or across networks. Thus, the VMM 620 is responsible for the placement of the page fault boundary 232 and the determination of active pages 220 and inactive pages 230, which reside in memory and on the disk subsystem 300.

The file system software 640, among other tasks, and along with the disk drivers 660, are responsible for the effective movement of inactive pages between the memory subsystem 200 and the disk subsystem 300. The file system software 640 may have an interface which is called by the VMM 620 software for the task of data movement to and from the computer disk and network subsystems. The file system 640 software maintains file allocation tables and bookkeeping to locate inactive pages that have been written to disk. In order for the file system to operate, the file system calls the software disk drivers 660 for DMA control of data movement and physical disk control. Instructions are programmed into the disk controller 310 of the disk subsystem 300 by the file system 640 software. Thus, when application data exceeds the available system memory space, the VMM 620 allocates and reallocates active and inactive pages for best operation of application data and instructs the file system 640 to instruct the disk driver 660 to carry out the DMA operation and page movement tasks.

For the purpose of this disclosure, it is helpful to understand the relative read and write time requirements for CPU read and write operation to or from each of the subsystems 100, 200, and 300. For example, for the CPU subsystem 100, a read and write operation to or from the L1 120 or L2 130 cache memory is on the order of tens of nanoseconds. A CPU 110 read/write from/to the memory subsystem 200 is on the order of hundreds of nanoseconds. A CPU read or write and/or a memory controller DMA read or write to the disk subsystem 300 is on the order of milliseconds. To move a page (typically 4096 bytes) from the inactive page 230 area to the active page 220 by the CPU 110 typically requires 3 μs for the page fault software plus 7 μs for the data move, or 10 μs of overhead. For the DMA controller, typically located in the memory controller 210, to read or DMA a page from disk cache 320 requires about 1 ms, while movement of a page to physical disk requires about 10 ms. Thus, the data transfer time from disk subsystem 300 to memory subsystem 200 is about three orders of magnitude longer than from memory subsystem 200 to CPU subsystem 100 L1/L2 cache 120/130 memory. This represents an area of desired improvement. In addition, the speed of CPU reads/writes to and from the memory subsystem 200 is also an area of desired improvement.

Certain prior art systems utilize multiple compression and decompression devices to achieve faster compression rates for I/O data sent and stored on disk. No prior art currently exists which uses in-line memory compression technology at the memory interface or on memory modules to achieve improved system performance. Therefore, a new system and method is desired to improve overall memory performance, including a reduction in the effective page swap time overhead as seen in present day computing systems. The present invention addresses these problems in a unique and novel hardware and software architecture.

SUMMARY OF THE INVENTION

One embodiment of the invention comprises a system and method for managing a functional unit in a system using a data movement engine.

An exemplary system may comprise a CPU coupled to a memory controller. The memory controller may include or couple to a data movement engine (DME). The memory controller may in turn couple to a system memory, which may comprise one or more memory modules. The system memory may also include at least one functional unit. The functional unit may be comprised on a memory module of the system memory or may be comprised in other portions of the system memory. In one embodiment, the functional unit may be comprised on the computer motherboard and positioned between the memory controller and the memory modules or system memory. In one embodiment, a plurality of functional units may be comprised in the system memory. For example, each memory module may include a functional unit. The functional unit may also be comprised on another device, such as a network device, graphics device, etc.

The memory controller may couple to an expansion bus such as a PCI bus. Various devices may be coupled to the expansion bus such as a non-volatile memory, a video device and an I/O device such as a network interface card.

The memory controller may be comprised in computer chipset logic, such as North Bridge and/or South Bridge logic, or future implementations of chipset logic. The DME engine may be comprised in the chipset logic, and is preferably comprised in or closely coupled to the memory controller. In one embodiment, the DME may be external to, and possibly closely coupled to the memory controller or the chipset logic. For example, the DME may be comprised on the computer motherboard coupled to the chipset logic.

The DME may be any of various types of data movement engines. In one embodiment, the DME may include functionality of a DMA (direct memory access) engine, or an enhanced DMA engine. The DME may operate to transfer data to/from the system memory and/or the functional unit, as described herein. In one embodiment, the DME may also include multiple DME channels or multiple DME contexts.

The DME may operate to direct the functional unit to perform operations on data in the system memory. For example, the DME may read source data from the system memory, the DME may then write the source data to the functional unit, the functional unit may operate on the data to produce modified data, the DME may then read the modified data from the functional unit, and the DME may then write the modified data to a destination in the system memory. Thus the DME may direct the functional unit to perform an operation on data in system memory using four data movement operations.

The DME may also perform various other data movement operations in the computer system, e.g., data movement operations that are not involved with operation of the functional unit. For example, the DME may perform data movement operations between the system memory and the non-volatile memory, between the system memory and the I/O device, between the CPU and any of various devices, etc. In general, the DME may be operable to transfer or move data between any two devices in the computer system. The DME may operate to perform data movement operations under control of (at the direction of) software executing on the CPU. The DME may also operate to perform data movement operations independently of the CPU, thus allowing the CPU to perform processing operations in parallel or concurrently with the data movement operations of the DME.

The functional unit may be any of various types of processing or functional devices. In the preferred embodiment of the invention, the functional unit is a compression/decompression (codec) engine for compressing and/or decompressing data written to/from the system memory, or other devices. In an alternate embodiment, the functional unit may be an encryption/decryption engine for encrypting/decrypting data as it is transferred to/from the system memory. In another embodiment, the functional unit may comprise a digital signal processor (DSP) for performing signal processing functions on data. In another embodiment, the functional unit may include several functions. In other words, the system may include multiple functional units. For example, the system memory may include both a codec engine and an encryption/decryption engine.

The functional unit may be comprised in any of various components of the computer system. For example, the functional unit may be comprised in the system memory (e.g., on a memory module), in the memory controller, on an I/O device, such as a network interface card, on a video device, or other location. The methods described herein for configuring and operating the DME to read/write data from/to the functional unit to accomplish various operations may be performed regardless of the location of the functional unit.

In one embodiment, the functional unit is a compression engine and/or decompression engine comprised in the system memory, e.g., on a memory module. In this embodiment, the CPU may configure the DME for compression and/or decompression operations.

For a compression or decompression operation, the CPU may create one or more commands which specify compression or decompression, respectively, of first data. Each of the commands may comprise at least one source address of the first data and at least one destination address. The CPU may create these commands in the system memory, or may provide these commands directly to registers in the DME. The CPU may create the one or more commands in response to software execution. For example, the CPU may create the one or more commands in response to a virtual memory manager (VMM) selecting the first data for removal from the system memory, for restoration to the system memory, or for in-memory compression or decompression. The CPU may also create the one or more commands in response to a software driver executing on the CPU. The DME may then access the one or more commands from system memory and execute the commands.

In a compression operation, during execution of each command, the DME may read first data from the system memory and write the first data to the compression engine. The compression engine included on the at least one memory module may then compress the first data to form first compressed data. The DME may then read the first compressed data from the at least one memory module and write the first compressed data to the system memory, e.g., to a compressed portion of system memory. Alternatively, the DME may write the first compressed data to the non-volatile memory. As another operation, after writing the first compressed data to the system memory, the DME may transfer the first compressed data from the system memory to the nonvolatile memory, which involves the DME reading the first compressed data from the system memory and writing the first compressed data to the nonvolatile memory.

In a decompression operation, during execution of each command, the DME may read first compressed data from the system memory and write the first compressed data to the at least one memory module. The decompression engine included on the at least one memory module may then decompress the first compressed data to form the first data and may transfer the first data to the system memory, e.g., to an uncompressed portion of system memory. Alternatively, the DME may write the first data to the nonvolatile memory. As another operation, after writing the first data to the system memory, the DME may transfer the first data from the system memory to the nonvolatile memory, which involves the DME reading the first data from the system memory and writing the first data to the nonvolatile memory.

As another operation, the decompression engine included on the at least one memory module may decompress first compressed data to form the first data and the DME may transfer the first data from the system memory to the nonvolatile memory. The first compressed data may then be removed from the system memory. Alternatively, the compression engine included on the at least one memory module may compress first data to form first compressed data and the DME may transfer the first compressed data from the system memory to the nonvolatile memory. The first data may then be removed from the system memory.

The removal of data (compressed or uncompressed) from the system memory may be performed based on certain metrics. For example, the CPU may calculate a usage rate of the compressed data and compare the usage rate of the compressed data to a minimum usage rate. The compressed data is removed from the system memory when the usage rate of the compressed data being below the minimum usage rate.

In one embodiment, the compression engine comprises an input buffer and an output buffer. The DNE operates to write data to be compressed to the input buffer. The compression engine compresses the data and stores the resultant compressed data in the output buffer. The DME may then read the resultant compressed data from the output buffer. The decompression engine may also comprise an input buffer and an output buffer. The DME operates to write data to be decompressed to the input buffer. The decompression engine decompresses the data and stores the resultant uncompressed data in the output buffer. The DME may then read the resultant uncompressed data from the output buffer.

In one embodiment, the system further includes a virtual memory manager (VMM), a compressed memory manager for managing the first compressed portion of the system memory, and a driver for managing the data movement engine;

wherein the method further comprises:
the VMM selecting the first data for removal from the system memory;
the compressed memory manager generating a write request to the driver in response to the VMM selecting the first data for removal from the system memory; and
the driver generating one or more command blocks to instruct the data movement engine to perform said reading the first data from the system memory, said writing the first data to the at least one memory module, said reading the first compressed data from the at least one memory module, and said writing the first compressed data to the first compressed portion of the system memory.

In one embodiment, the compression engine is a parallel compression engine which operates to analyze and compress a plurality of symbols from the first data in parallel to form the first compressed data. The parallel compression engine may operate to compare each of a plurality of symbols with each of a plurality of entries in a history table concurrently.

In one embodiment, the functional unit is comprised in the memory controller (or in the chipset logic). The functional unit may be coupled closely to the DME, which also may be comprised in the memory controller (or in the chipset logic). The placement of the functional unit proximate to the DME may operate to simplify data movement operations between the DME and the functional unit and/or system memory. For example, the DME may read source data from the system memory, the source data may be received into the functional unit in the memory controller, the functional unit may operate on the data to produce modified data, and then the DME may then write the modified data back to the system memory. Thus the DME may direct the functional unit to perform an operation on data in system memory using only two data movement operations.

In one embodiment, multiple memory channels are coupled between the memory controller and the system memory and are used for concurrent data movement operations of reads and writes between the DME and the system memory and/or the functional unit. In one embodiment, the DME may also include multiple DME channels or multiple DME contexts. The multiple DME channels or multiple DME contexts may be used in conjunction with the multiple memory channels.

In one embodiment, the system of FIGS. 4A and 4B may include at least one memory channel between the memory controller and the system memory and at least one memory channel between the memory controller and the functional unit. In another embodiment, the system may include a plurality of memory channels between the memory controller and the system memory and a plurality of memory channels between the memory controller and the functional unit.

Thus, in one embodiment, the DME may be operable to read source data from the system memory concurrently with writing source data to the functional unit. The DME may also be operable to read modified data from the functional unit concurrently with writing modified data to the system memory. The DME may also be operable to write source data to the functional unit concurrently with reading modified data from the functional unit. Thus, in one embodiment, the DME may be operable to perform 2, 3, or 4 data movement operations concurrently or in parallel. The DME may also be operable to perform other data movement operations involving other devices concurrently or in parallel with data movement operations involving the functional unit.

In one embodiment, the DME may be operable to read source data from the system memory into the functional unit concurrently with writing modified data from the functional unit to the system memory. Thus, in one embodiment, the DME may be operable to perform 2 (or more) data movement operations concurrently or in parallel. The DME may also be operable to perform other data movement operations involving other devices concurrently or in parallel with data movement operations involving the functional unit.

Various other embodiments are contemplated which involve one or more DMEs and one or more functional units, wherein the DMEs and functional units may be distributed among any of various locations in the system. For example, the system may comprise a plurality of DMEs which communicate with a single functional unit. Alternatively, the system may comprise a single DME which communicates with a plurality of functional units. As another example, the system may comprise a plurality of DMEs which communicate with a plurality of functional units.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

INCORPORATION BY REFERENCE

U.S. provisional patent application Serial No. 60/314,538 titled "System and Method for Managing a Codec Engine for Memory Compression/Decompression Operations Using a Data Movement Engine" and filed on Aug. 23, 2001, is hereby incorporated by reference in its entirety as though fully and completely set forth herein.

U.S. patent application Ser. No. 09/550,380 titled "Parallel Compression/Decompression System and Method for Implementation of In-Memory Compressed Cache Improving Storage Density and Access Speed for Industry Standard Memory Subsystems and In-Line Memory Modules" filed on Apr. 14, 2000, is hereby incorporated by reference in its entirety as though fully and completely set forth herein.

Bandwidth Reducing Memory Controller Including Scalable Embedded Parallel Data Compression and Decompression Engines" whose inventors are Thomas A. Dye, Manuel J. Alvarez II and Peter Geiger and was filed on Jan. 29, 1999, is hereby incorporated by reference in its entirety as though fully and completely set forth herein.

U.S. Pat. No. 6,208,273 titled "System and Method for Performing Scalable Embedded Parallel Data Compression" whose inventors are Thomas A. Dye, Manuel J. Alvarez II and Peter Geiger and was filed on Oct. 20, 1999, is hereby incorporated by reference in its entirety as though fully and completely set forth herein.

U.S. patent application Ser. No. 09/491,343 titled "System and Method for Performing Scalable Embedded Parallel Data Decompression" whose inventors are Thomas A. Dye, Manuel J. Alvarez II and Peter Geiger and was filed on Jan. 26, 2000, is hereby incorporated by reference in its entirety as though fully and completely set forth herein.

U.S. Pat. No. 6,002,411 titled "Integrated Video and Memory Controller with Data Processing and Graphical Processing Capabilities" whose inventor is Thomas A. Dye and which was issued Dec. 14, 1999, is hereby incorporated by reference in its entirety as though fully and completely set forth herein.

U.S. patent application Ser. No. 08/916,464 titled "Memory Controller Including Embedded Data Compression and Decompression Engines" whose inventor is Thomas A. Dye and which was filed Aug. 8, 1997, is hereby incorporated by reference in its entirety as though fully and completely set forth herein.

Figure 1:
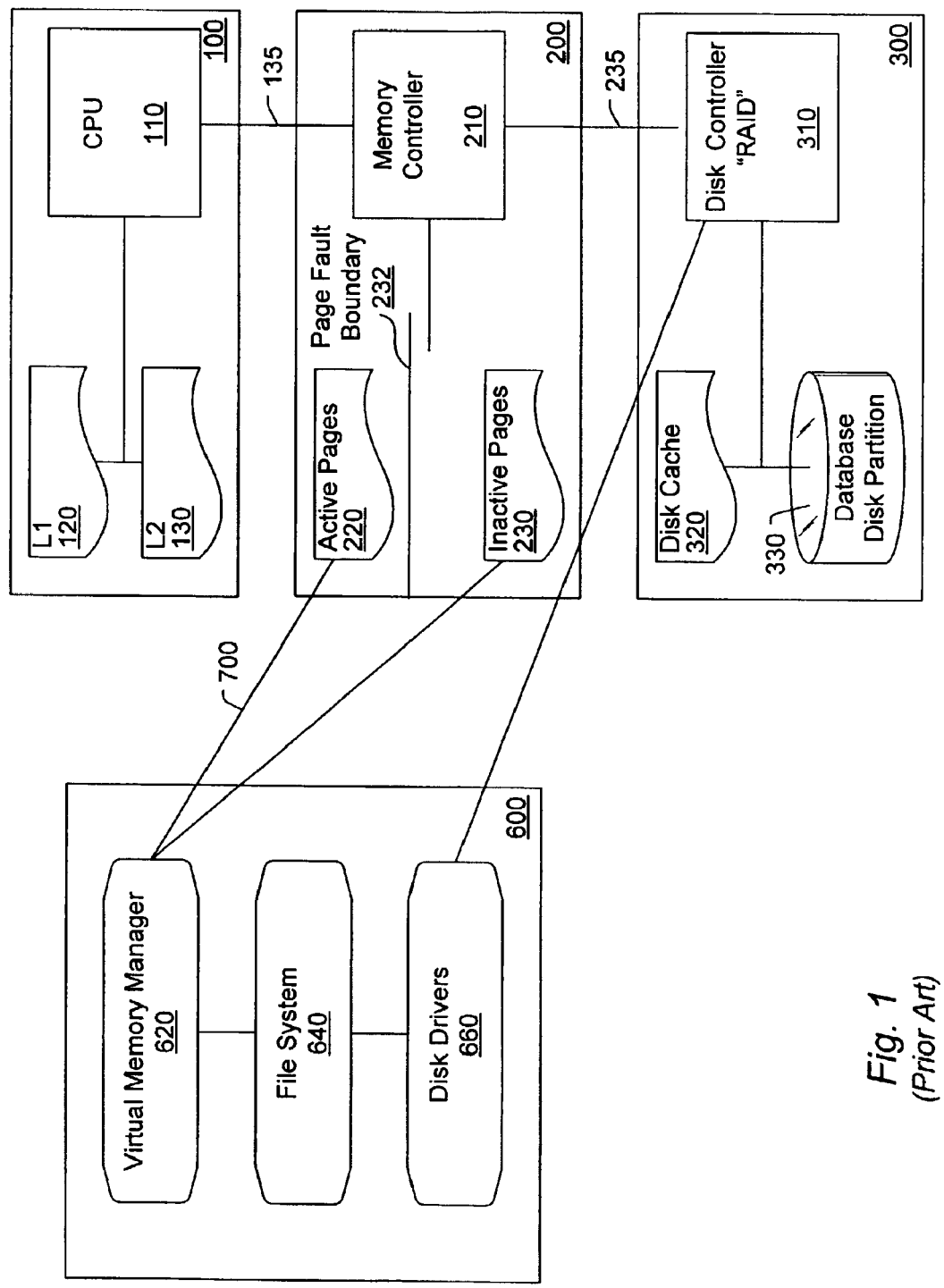
FIG. 1 illustrates the prior art computer data memory and storage hierarchy from the CPU cache, to the main system memory to the disk subsystem.
Figure 2:
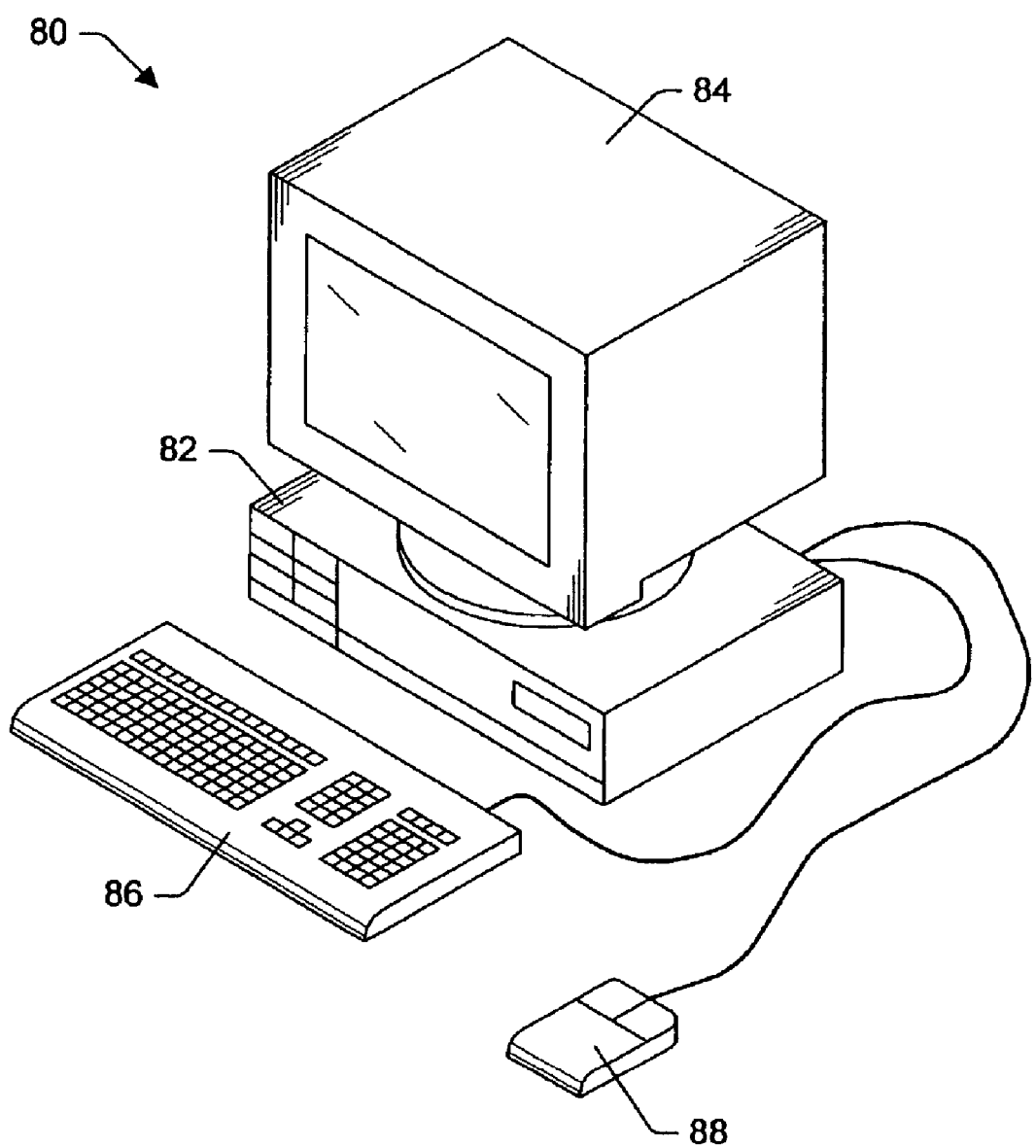
FIG. 2 illustrates an exemplary computer system.

Computer Architecture of the Preferred Embodiment
FIG. 2—Exemplary Computer System FIG. 2 illustrates a computer system, which is one embodiment of a system where an embodiment of the present invention may be used. The methods described herein may be implemented in any of various systems, such as a computer system, Internet appliance, PDA (personal digital assistant), television system, or any device that includes a memory. As used herein, the term "computer system" is intended to include any of various systems or devices which include a processor that executes instructions and/or accesses data from a memory medium.

FIGS. 3–6: Exemplary Computer Block Diagrams

FIGS. 3–6 illustrate exemplary block diagrams of one embodiment of a computer system. FIGS. 3–6 show simplified embodiments, and elements of a computer system not necessary to an understanding of the invention are omitted for simplicity.

Figure 3A:
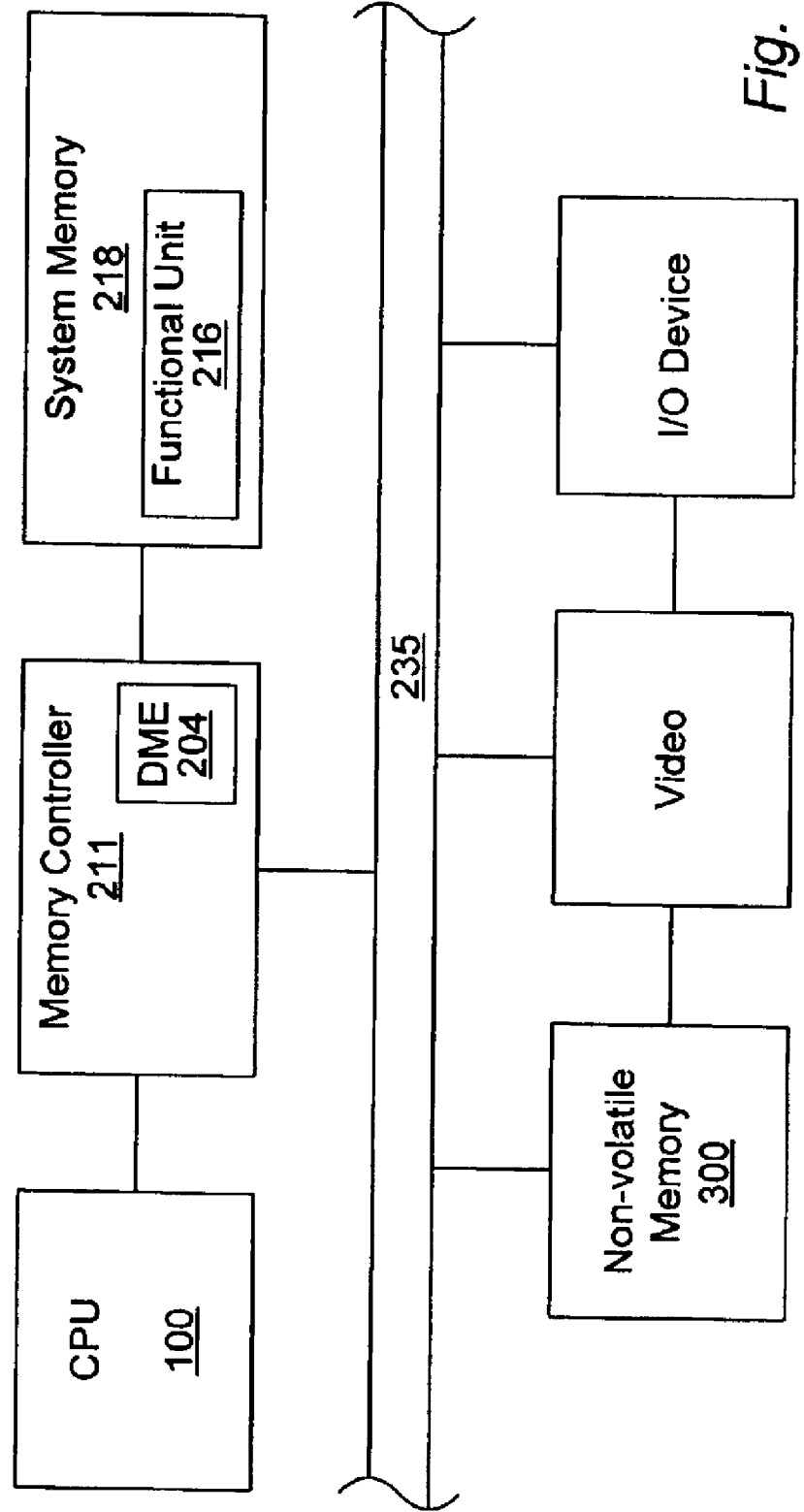
FIGS. 3A, 3B, 4A and 4B are block diagrams illustrating various exemplary embodiments including a data movement engine (DME) and a functional unit.

FIG. 3A is a block diagram illustrating an exemplary embodiment of a computer system. As shown, the system may comprise a CPU 100 coupled to a memory controller 211. The memory controller 211 may include a data movement engine (DME) 204 as shown. The memory controller 211 in turn couples to a system memory 218. The system memory 218 may comprise one or more memory modules. The system memory 218 may also include at least one functional unit 216. The functional unit 216 may be comprised on a memory module of the system memory or may be comprised in other portions of the system memory 218. In one embodiment, the functional unit may be comprised on the computer motherboard and positioned between the memory controller and the memory modules or system memory.

In one embodiment, a plurality of functional units 216 may be comprised in the system memory 218. For example, each memory module may include a functional unit 216.

The memory controller 211 may couple to an expansion bus such as a PCI bus 235. Various devices may be coupled to the expansion bus such as a non-volatile memory 300, a video device and an I/O device such as a network interface card.

The memory controller 211 may be comprised in computer chipset logic, such as North Bridge and/or South Bridge logic, or future implementations of chipset logic. The DME engine 204 may be comprised in the chipset logic, and is preferably comprised in or closely coupled to the memory controller 211. In one embodiment, the DME may be external to, and possibly closely coupled to the memory controller 211 or the chipset logic. For example, the DME 204 may be comprised on the computer motherboard coupled to the chipset logic.

The DME 204 may be any of various types of data movement engines. In one embodiment, the DME 204 may include functionality of a DMA (direct memory access) engine, or an enhanced DMA engine. The DME 204 may operate to transfer data to/from the system memory 218 and/or the functional unit 216, as described in detail below. In one embodiment, the DME 204 may also include multiple DME channels or multiple DME contexts.

The DME 204 may operate to direct the functional unit 216 to perform operations on data in the system memory 218. For example, the DME 204 may read source data from the system memory 218, the DME 204 may then write the source data to the functional unit 216, the functional unit 216 may operate on the data to produce modified data, the DME 204 may then read the modified data from the functional unit 216, and the DME 204 may then write the modified data to a destination in the system memory 218. Thus the DME 204 may direct the functional unit 216 to perform an operation on data in system memory 218 using four data movement operations.

The DME 204 may also perform various other data movement operations in the computer system, e.g., data movement operations that are not involved with operation of the functional unit. For example, the DME may perform data movement operations between the system memory 218 and the non-volatile memory 300, between the system memory 218 and the I/O device, between the CPU 100 and any of various devices, etc. In general, the DME 204 may be operable to transfer or move data between any two devices in the computer system. The DME 204 may operate to perform data movement operations under control of (at the direction of) software executing on the CPU. The DME 204 may operate to perform data movement operations independently of the CPU 100, thus allowing the CPU 100 to perform processing operations in parallel or concurrently with the data movement operations of the DME 204.

The functional unit 216 may be any of various types of processing or functional devices. In the preferred embodiment of the invention, the functional unit 216 is a compression/decompression (codec) engine for compressing and/or decompressing data written to/from the system memory 218, or other devices. In an alternate embodiment, the functional unit 216 may be an encryption/decryption engine for encrypting/decrypting data as it is transferred to/from the system memory. In another embodiment, the functional unit 216 may comprise a digital signal processor (DSP) for performing signal processing functions on data. In another embodiment, the functional unit 216 may include several functions. In other words, the system may include multiple functional units. For example, the system memory 218 may include both a codec engine and an encryption/decryption engine.

The functional unit 216 may be comprised in any of various components of the computer system. In the embodiment shown in FIG. 3A, the functional unit 216 is comprised in the system memory 218. In another embodiment, the functional unit 216 may be comprised in the memory controller 211. In another embodiment, the functional unit 216 may be comprised on an I/O device, such as a network interface card. In another embodiment, the functional unit 216 may be comprised in a video device. The methods described herein for configuring and operating the DME 204 to read/write data from/to the functional unit 216 to accomplish various operations may also be performed where the functional unit is comprised on an I/O device such as a network interface device. Thus, in one embodiment, the functional unit 216 comprises a codec engine (or an encryption/decryption unit) comprised on a network interface card of the computer system.

Figure 3B:
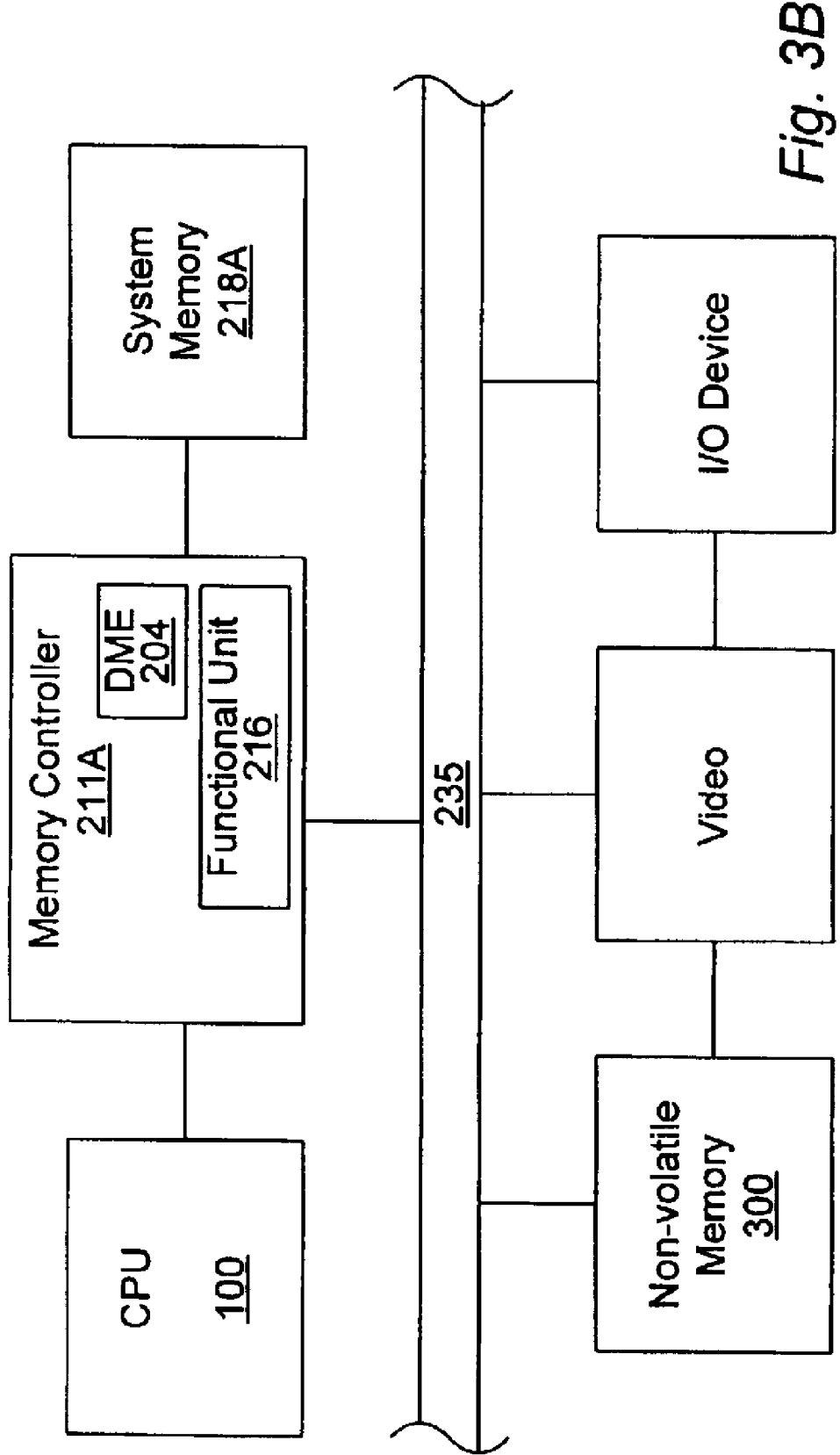

FIG. 3B illustrates a block diagram of a computer system similar to FIG. 3A. In the embodiment of FIG. 3B, the functional unit 216 is comprised in the memory controller 211A (or in the chipset logic). The functional unit 216 may be coupled closely to the DME 204, which also may be comprised in the memory controller (or in the chipset logic). The placement of the functional unit 216 proximate to the DME 204 may operate to simplify data movement operations between the DME 204 and the functional unit 216 and/or system memory 218.

For example, the DME 204 may read source data from the system memory 218, the source data may be received into the functional unit 216 in the memory controller 211A, the functional unit 216 may operate on the data to produce modified data, and then the DME 204 may then write the modified data back to the system memory 218A. Thus the DME 204 may direct the functional unit 216 to perform an operation on data in system memory 218 using only two data movement operations.

Figure 4A:
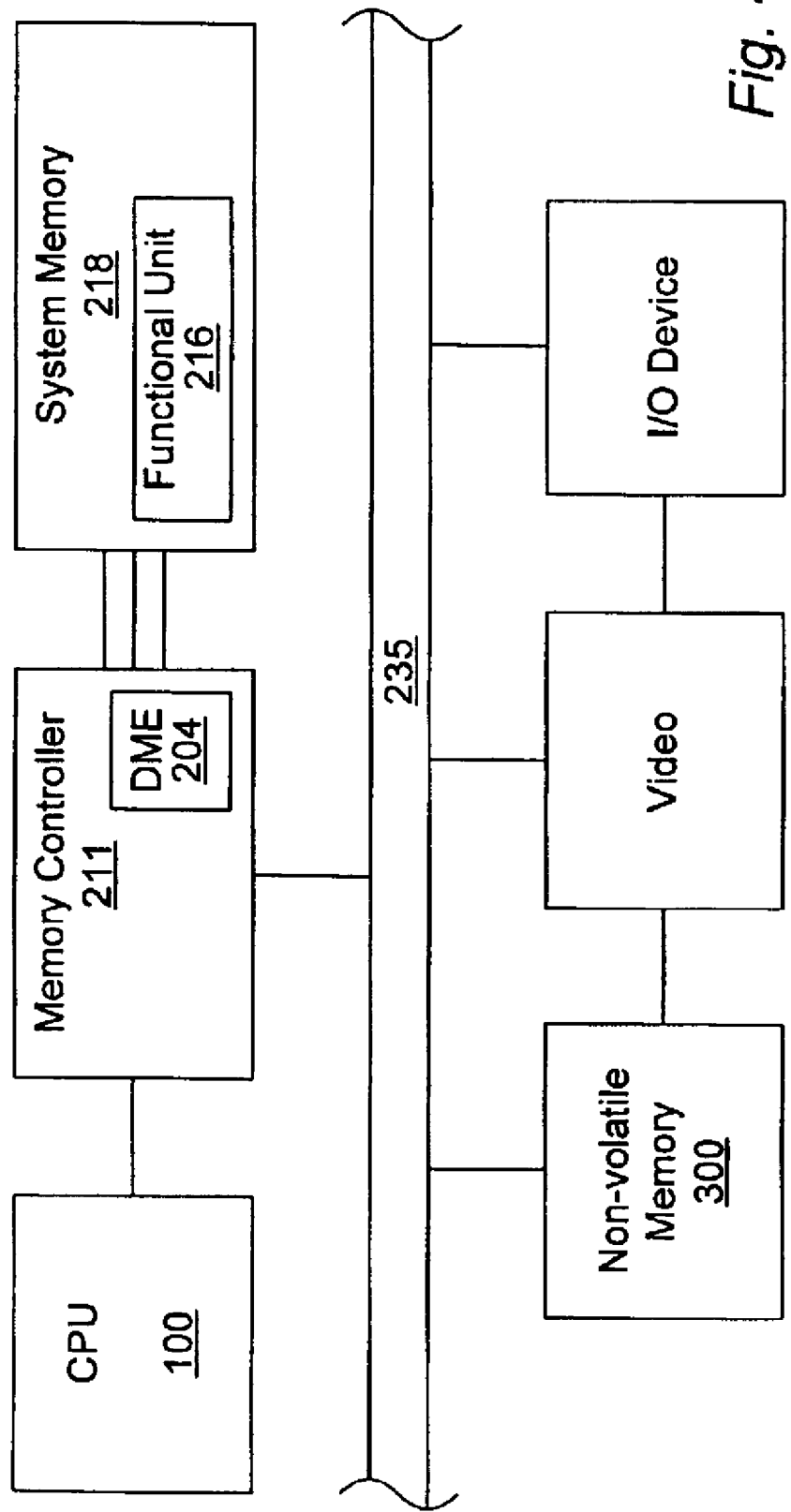
Figure 4B:
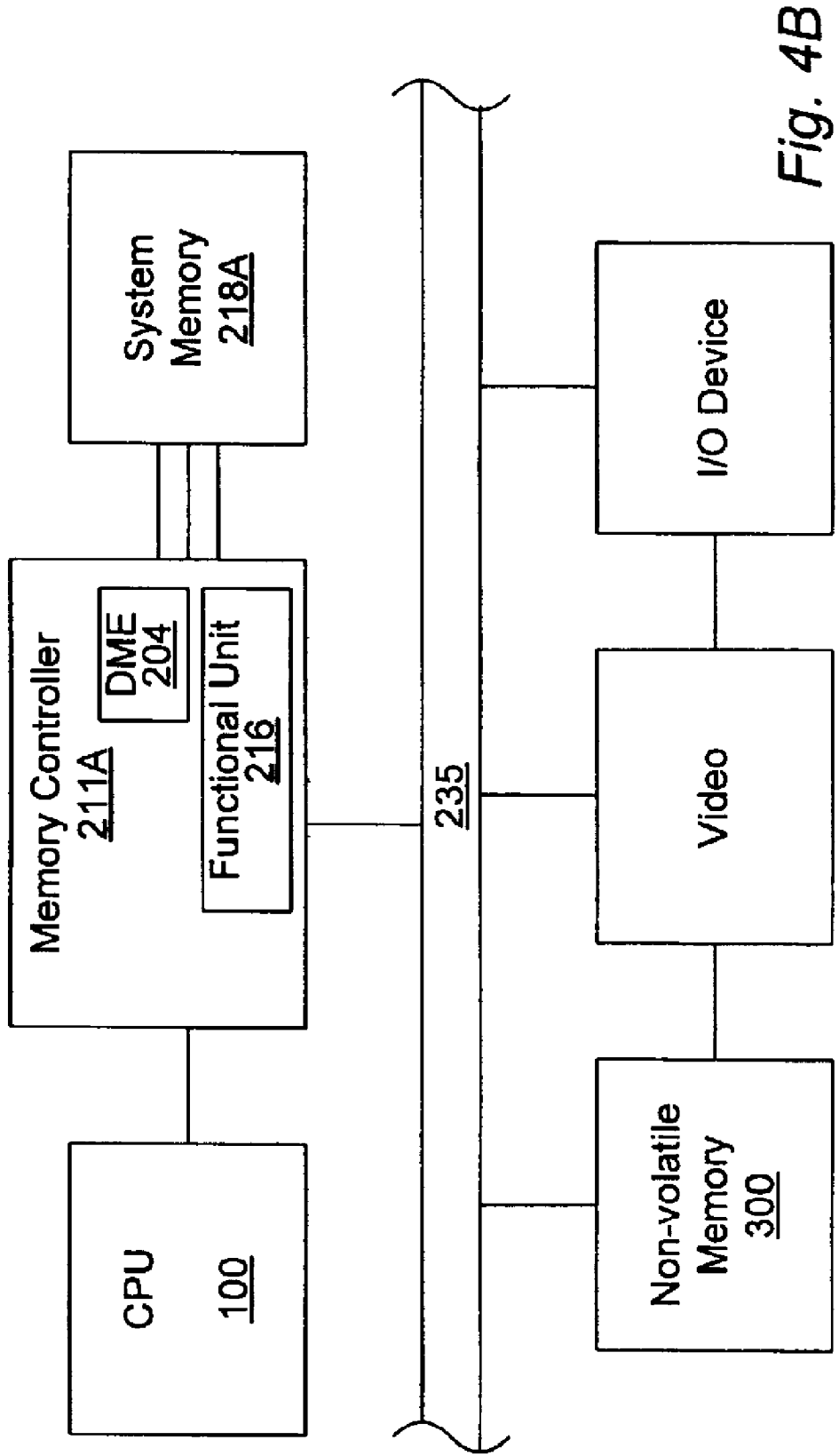

FIGS. 4A and 4B illustrate embodiments similar to FIGS. 3A and 3B, where multiple memory channels are coupled between the memory controller 211 and the system memory 218. These multiple memory channels may be used for concurrent data movement operations of reads and writes between the DME 204 and the system memory 218 and/or the functional unit 216. In one embodiment, the DME 204 may also include multiple DME channels or multiple DME contexts. The multiple DME channels or multiple DME contexts may be used in conjunction with the multiple memory channels.

In one embodiment, the system of FIGS. 4A and 4B may include at least one memory channel between the memory controller 211 and the system memory 218 and at least one memory channel between the memory controller 211 and the functional unit 216. In another embodiment, the system of FIGS. 4A and 4B may include a plurality of memory channels between the memory controller 211 and the system memory 218 and a plurality of memory channels between the memory controller 211 and the functional unit 216.

Thus, in the embodiment of FIG. 4A, the DME 204 may be operable to read source data from the system memory 218 concurrently with writing source data to the functional unit 216. The DME 204 may also be operable to read modified data from the functional unit 216 concurrently with writing modified data to the system memory 218. The DME 204 may also be operable to write source data to the functional unit 216 concurrently with reading modified data from the functional unit 216. Thus, in the embodiment of FIG. 4A, the DME 204 may be operable to perform 2, 3, or 4 data movement operations concurrently or in parallel. The DME 204 may also be operable to perform other data movement operations involving other devices concurrently or in parallel with data movement operations involving the functional unit 216.

In the embodiment of FIG. 4B, the DME 204 may be operable to read source data from the system memory 218 into the functional unit 216 concurrently with writing modified data from the functional unit 216 to the system memory 218. Thus, in the embodiment of FIG. 4B, the DME 204 may be operable to perform 2 (or more) data movement operations concurrently or in parallel. The DME 204 may also be operable to perform other data movement operations involving other devices concurrently or in parallel with data movement operations involving the functional unit 216.

Various other embodiments are contemplated which involve one or more DMEs 204 and one or more functional units 216, wherein the DMEs 204 and functional units 216 may be distributed among any of various locations in the system. For example, the system may comprise a plurality of DMEs 204 which communicate with a single functional unit 216. Alternatively, the system may comprise a single DME 204 which communicates with a plurality of functional units 216. As another example, the the system may comprise a plurality of DMEs 204 which communicate with a plurality of functional units 216.

Figure 5A:
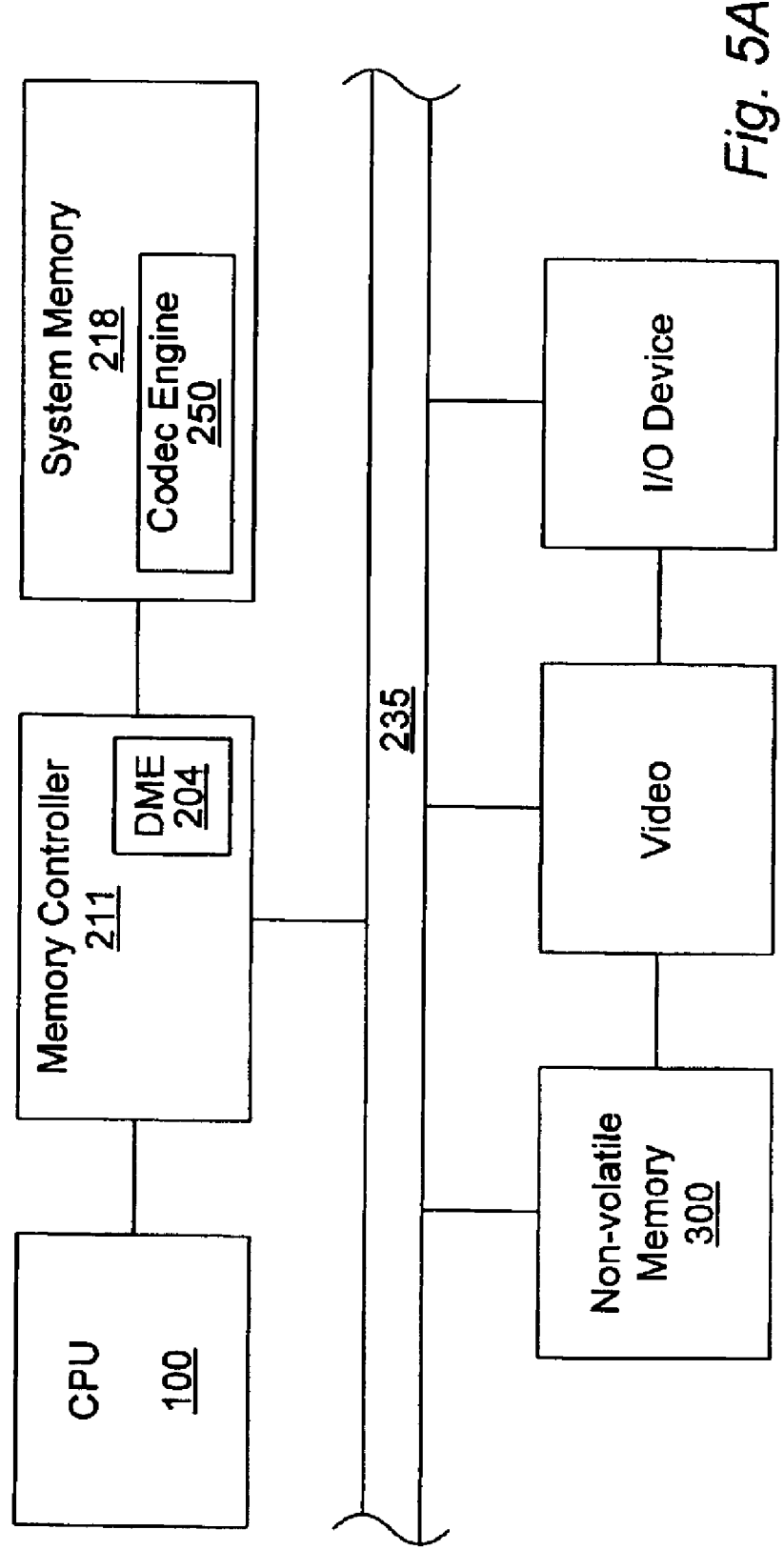
FIGS. 5A and 5B are block diagrams illustrating various exemplary embodiments where the functional unit is a codec engine.
Figure 5B:
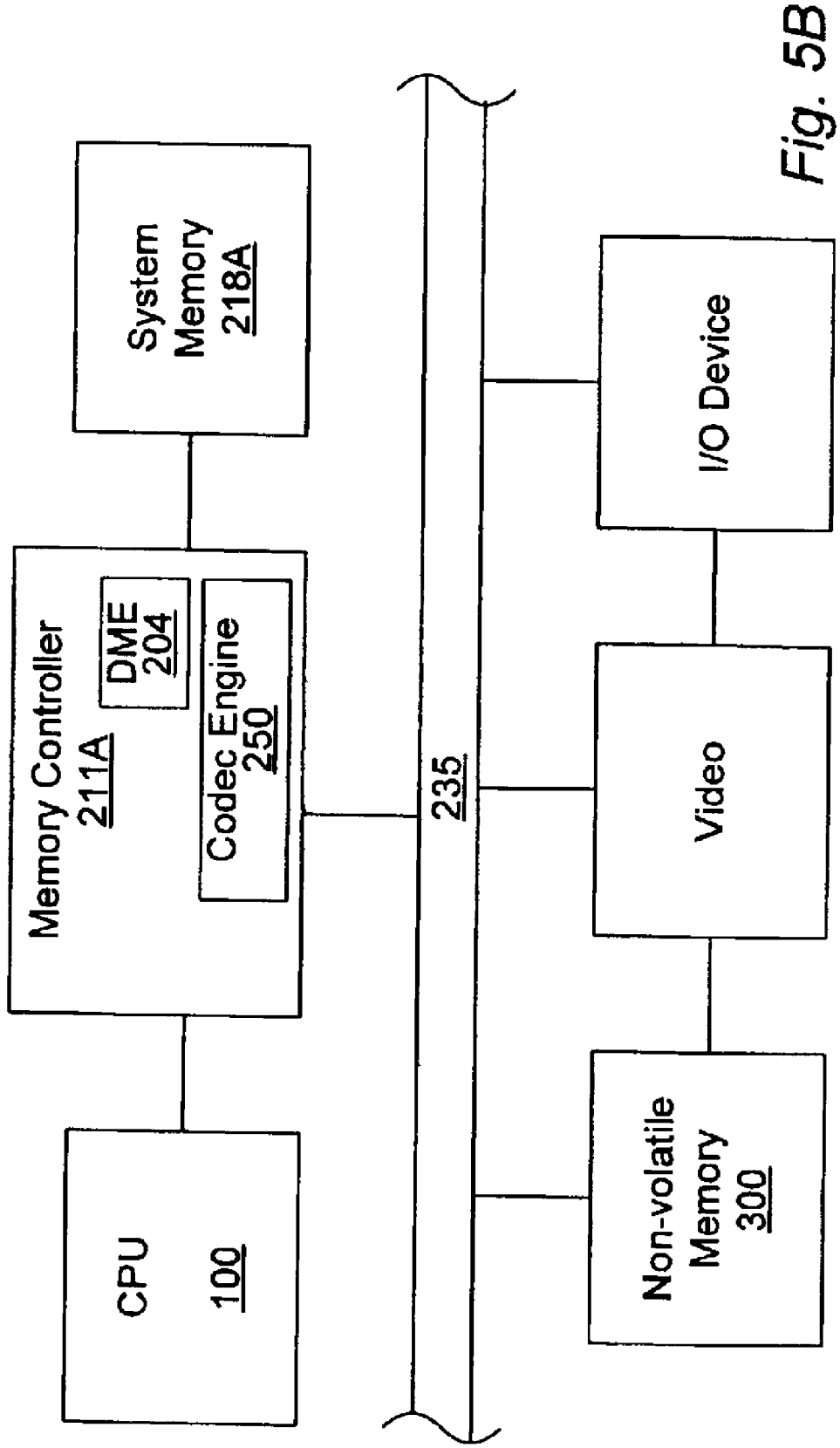

FIGS. 5A and 5B illustrate exemplary embodiments similar to 3A and 3B, where the functional unit 216 is a codec engine 250. FIGS. 5A and 5B are exemplary only, and the system may have any of the various embodiments described above.

In the embodiment of FIG. 5A, the DME 204 may operate to direct the codec engine 250 to perform operations on data in the system memory 218. For example, in a data compression operation, the DME 204 may read source data from the system memory 218, the DME 204 may then write the source data to the codec engine 250, the codec engine 250 may compress the data to produce compressed data, the DME 204 may then read the compressed data from the codec engine 250, and the DME 204 may then write the compressed data to a destination in the system memory 218. Thus the DME 204 may direct the codec engine 250 to compress data in system memory 218 using four data movement operations. For example, in a data decompression operation, the DME 204 may read compressed source data from the system memory 218, the DME 204 may then write the compressed source data to the codec engine 250, the codec engine 250 may decompress the compressed data to produce uncompressed data, the DME 204 may then read the uncompressed data from the codec engine 250, and the DME 204 may then write the uncompressed data to a destination in the system memory 218. Thus the DME 204 may direct the codec engine 250 to decompress data in system memory 218 using four data movement operations.

In the embodiment of FIG. 5B, the placement of the codec engine 250 proximate to the DME 204 may operate to simplify data movement operations between the DME 204 and the codec engine 250 and/or system memory 218. For example, in a data compression operation, the DME 204 may read source data from the system memory 218, the source data may be received into the codec engine 250 in the memory controller 211A, the codec engine 250 may compress the data to produce compressed data, and the DME 204 may then write the compressed data back to the system memory 218A. Thus the DME 204 may direct the codec engine 250 to compress data in system memory 218 using only two data movement operations. For example, in a data decompression operation, the DME 204 may read compressed source data from the system memory 218, the compressed source data may be received into the codec engine 250 in the memory controller 211A, the codec engine 250 may decompress the compressed source data to produce uncompressed data, and the DME 204 may then write the uncompressed data back to the system memory 218A. Thus the DME 204 may direct the codec engine 250 to decompress data in system memory 218 using only two data movement operations.

The following describes embodiments of the present invention where the functional unit 216 is a codec engine 250 for compressing and/or decompressing data in (or to/from) the system memory 218 (e.g., for compressing and/or decompressing data being transferred between the system memory 218 and other devices in the computer system). However, the methods and operations described herein may also be applied where the functional unit 216 performs different operations, such as encryption and decryption, signal processing operations and other types of operations.

Figure 6:
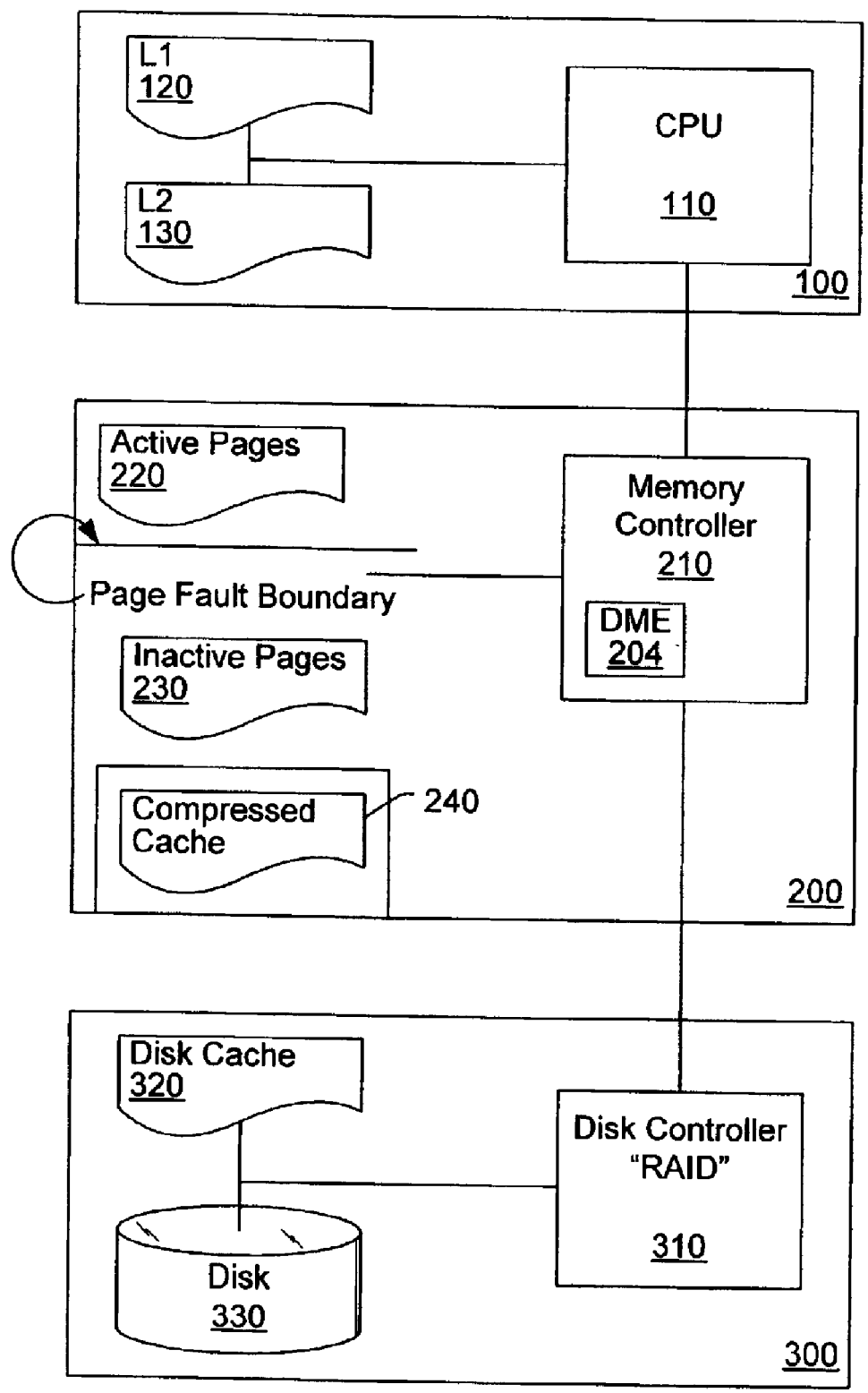
FIG. 6 illustrates the addition of compressed cache in the main system memory as indicated by the present invention.

FIG. 6—Computer System with Compressed Cache

FIG. 6 illustrates one embodiment of the invention. As shown in FIG. 6, an embodiment of the present invention may be implemented in a computer system having a CPU subsystem 100, a memory subsystem 200, and a nonvolatile memory subsystem 300. As indicated in FIG. 6, the CPU subsystem 100 is coupled to the memory subsystem 200, which is coupled to the disk subsystem 300. The CPU subsystem 100 includes a CPU 110 and may include an L1 cache 120 and an L2 cache 130. The memory subsystem 200 includes a memory controller 211 and system memory 218. The memory subsystem 200 also includes DME 204, as shown. The DME 204 may be comprised in the memory controller 211, as shown. System memory 218 may comprise Active Pages 220, Inactive Pages 230, and Compressed Cache 240. Compressed Cache 240 is thus located in the memory subsystem 200 of the computer.

Software executing on the CPU 110 may allocate a compressed cache (CC) 240. The CC 240 may be allocated within the normal memory map of the computer system. Compressed pages may be stored in the CC 240. The CC 240 may be allocated within system memory (also referred to as main memory or RAM) comprised of one or more volatile memory devices such as C-DIMMs (described below), DIMMs, SIMs, SDDIMMs, RIMMs, or other types of memory modules. Pages are generally 4096 bytes. In alternate embodiments, page sizes can be any size as desired by the operating system software. Instead of swapping inactive pages to the nonvolatile memory, the system and method may operate to store inactive pages in a compressed format in the CC 240. In addition, pages from the CC 240, which are maintained in compressed format, can be moved to disk or network in such format for future data storage, retrieval, or transmission over LANs or WANs. Thus, a second order benefit is achieved by storage of compressed pages in the I/O subsystem 300 instead of non-compressed pages.

Figure 9:
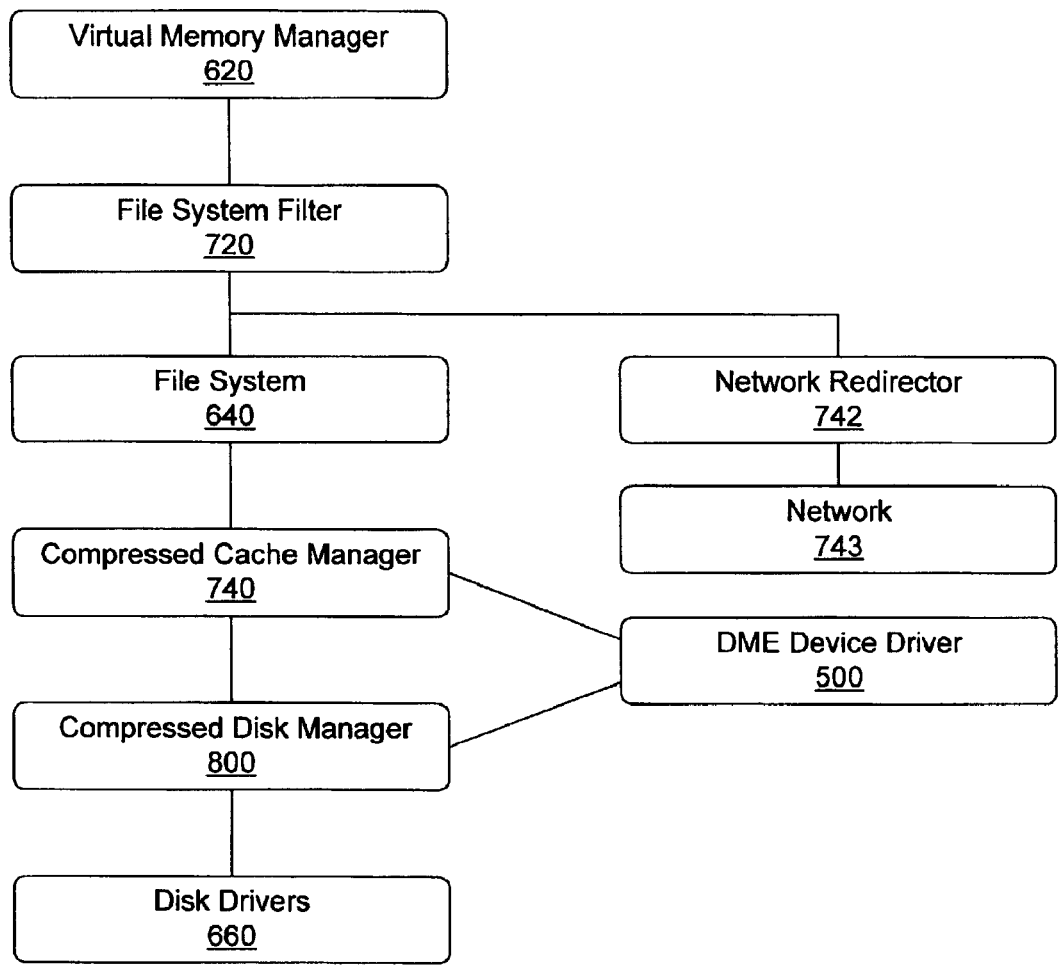
FIG. 9 illustrates the preferred software modules and drivers and where they reside into the Operating System software stack.

In one embodiment, three software programs or modules may be used in the system: the compressed cache manager (CCM), the compressed disk manager (CDM) and the C-DIMM device driver (DDD) (FIG. 9). In addition, these programs may be used individually or in combination as required by operating system software or application software.

In one embodiment, the CCM, CDM and DDD may be stand-alone software programs that operate independently of the Virtual Memory Manager (VMM). In this embodiment, the CCM and CDM may operate to direct the DME 204, in conjunction with codec engine 250, to compress pages being managed by the VMM, cache or store the compressed pages in a compressed cache and/or CPAT cache, and decompress and write pages to system memory being managed by the VMM in response to read requests from the VMM. These various operations may be performed substantially invisibly to the VMM. In other words, the VMM may have no knowledge of or control over the compression, storing, and decompression of pages.

The CCM and CDM may receive I/O requests from the VMM, examine the I/O requests, and direct the DME 204, possibly in conjunction with codec engine 250, to perform various operations in response to the I/O requests. To the VMM, it appears that invalidated pages are written to nonvolatile storage and requested pages are read from nonvolatile storage and returned to system memory as in prior art systems.

In other contemplated embodiments, one or more of the operations of the CCM and CDM software programs may be integrated into a virtual memory manager (VMM). In these embodiments, an enhanced VMM may directly instruct or control the DME 204, in conjunction with codec engine 250. The enhanced VMM may directly instruct or control the DME 204 to initiate the compression and caching or storing of pages to a compressed cache and/or CPAT cache, and possibly to initiate the decompression and reading back into system memory of previously cached or stored pages. In one contemplated embodiment, the CCM and CDM modules may not be necessary, as all of their operations are fully incorporated in an enhanced VMM.

In various embodiments, the DME 204 and memory controller 211 may be integrated into the processor subsystem 100. In other embodiments, the VMM may execute partially or completely in the memory subsystem 200.

Figure 7:
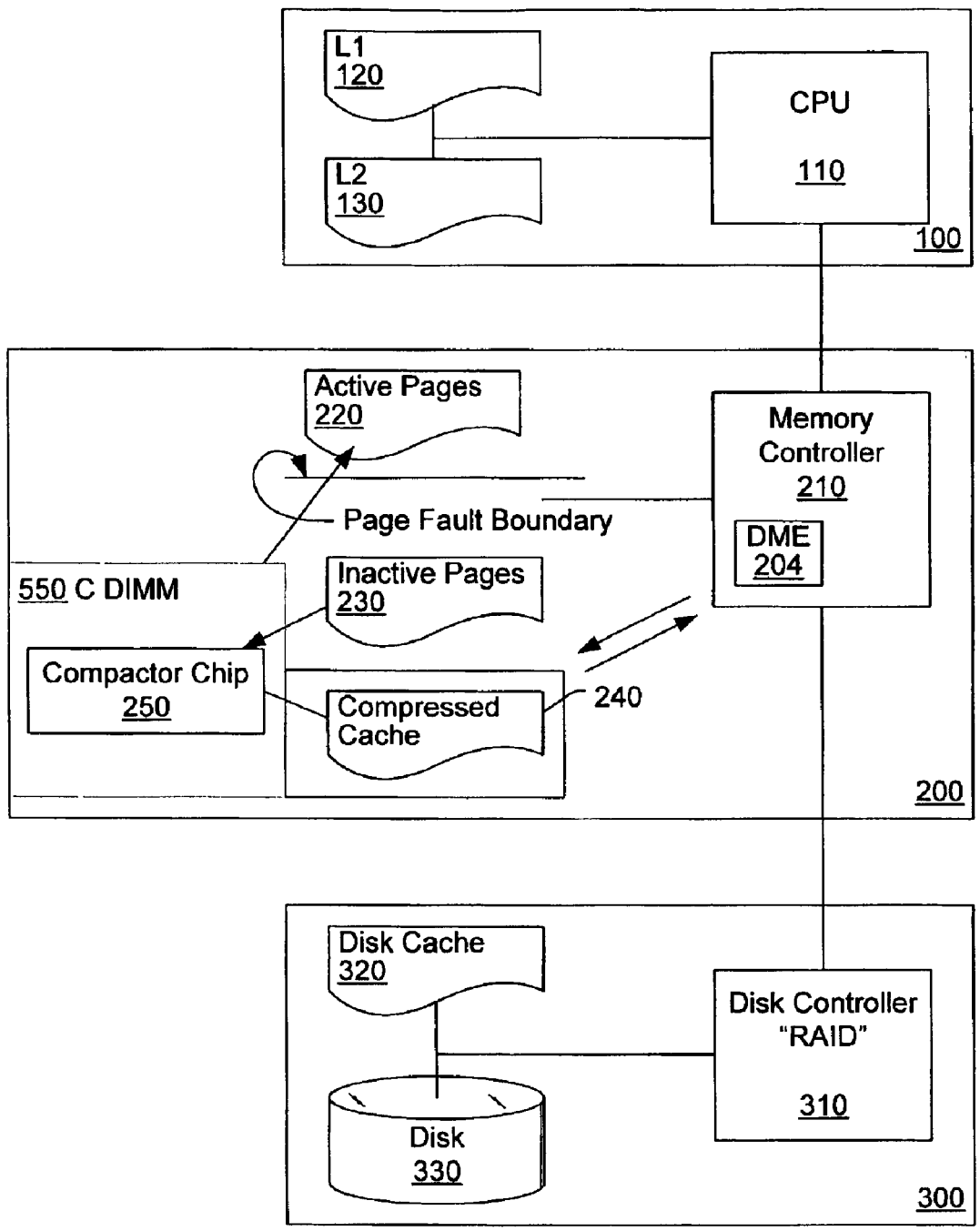
FIG. 7 illustrates the system of FIG. 6 with the addition of the C-DIMM to the system for control and operation of the compressed cache memory.

FIG. 7—A Computer System with a C-DIMM

FIG. 7 illustrates the system of FIG. 6 including a C-DIMM device 550 comprised as part of the system memory. The embodiment of FIG. 7 corresponds to the embodiments of FIGS. 3A, 4A, and 5A. Within the memory subsystem 200 of the preferred embodiment, the memory controller 211 may be coupled to one or more C-DIMM (Compression Enabled Dual In-line Memory Module) devices 550 and may couple to other memory devices, e.g., DIMM modules. As used herein, the term "compression enabled memory device" comprises a memory device or memory module that includes compression logic and/or decompression logic comprised on the memory device. The compression enabled memory device is preferably implemented in a dual in-line memory module (DIMM) and is referred to herein as a C-DIMM. The compression enabled memory device may be implemented in any of various types of memory devices, such as DIMs, SIMMs, SDDIMMs, RIMMs, or other types of memory devices or modules.

The C-DIMM devices 550 and the DIMM modules may be partitioned by the system software into active pages 220, inactive pages 230, and compressed pages 240, each of which make up components of the total system memory.

The Compression enabled Dual-Inline-Memory Module (C-DIMM 550) includes a codec engine, shown as compactor chip 250. In the preferred embodiment, the C-DIMM 550 includes parallel compression and decompression technology which operates to increase the performance or reduce the cost of computers, including servers and workstations, by increasing the effective size and/or speed of memory. In one embodiment, the compactor chip 250 utilizes a method of using fast parallel compression and decompression technology as outlined in U.S. Pat. No. 6,208,273 and patent application Ser. Nos. 09/239,658, and 09/491,343 as referenced above. In the embodiment of FIG. 7, the fast parallel compression and decompression operations are accomplished by mounting the compactor chip 250 preferably into a memory device or module, such as an industry standard DIMM, SIMM or SODIMM or RIMM module. The C-DIMM 550 thus may comprise an industry standard memory module including the compression/decompression chip 250. The memory module is then compression/decompression enabled and may be plugged into the system memory subsystem 200 of the computing system.

In the preferred embodiment, the compactor chip 250 acts as a compression and decompression co-processor. The DME 204 operates to transfer data to/from the compactor chip 250 and control the compactor chip 250 under the direction of the application or C-DIMM driver and other software modules.

As indicated in FIG. 7, under direction of the C-DIMM software modules, the DME 204 operates to perform transfers to compress inactive pages 230 and store the inactive pages in memory in a compressed format. This may be accomplished by a DME read of the non-compressed inactive page 230 followed by a DME write to the C-DIMM memory aperture by the CPU. The C-DIMM memory aperture refers to a memory space, preferably on a C-DIMM memory module, wherein data in the C-DIMM memory aperture may be operated on by the compactor chip 250. The compactor chip 250 may operate to compress and/or decompress data in the C-DIMM memory operation. In response to the page write into the C-DIMM aperture, data is preferably compressed by the compactor chip 250 and stored in a C-DIMM read aperture. Then the DME 204 may read the compressed data from the C-DIMM read aperture and write the compressed page to the compressed cache 240 memory area. In this case, the VMM 620 may believe that the data was transferred to disk whereas in reality the data was compressed and stored in the CC 240 in system memory.

When the virtual memory manager (VMM) 620 requests a page from disk, the C-DIMM software modules may first examine the CC 240 for resident compressed pages. If the compressed page is resident within the CC 240, the C-DIMM software driver 500 may instruct the DME 204 to read the inactive compressed page from the CC 240 and write the inactive compressed page to the compactor chip 250 for decompression. The DME 204 may then read the decompressed page (new active page) from the compactor chip 250 and write the new active page into the area designated by the VMM 620. To the VMM 620 and file system 640, this process looks like a standard disk transfer of a page that had previously been swapped to disk and is read back to the active area of system memory. However, this was actually a fast decompression and read from the CC to the designated active page 220 memory area. Thus, the use of the DME 204, the compactor chip 250 and the allocation of the compressed cache 240 enables orders of magnitude faster response time when reading inactive, cached pages into the main memory 200 active page 220 memory area.

In alternate embodiments, the compactor chip may be "in-line" with the data transfer such that data is compressed or decompressed as it traverses between the CPU subsystem 100 and the memory subsystem 200. The fast parallel compression and decompression operations described above make the "in-line" embodiments feasible, as the compression and decompression of data are performed in "real-time." In one embodiment with an inline compactor chip, substantially all data transfers from the CPU subsystem 100 to the memory subsystem 200 are compressed by the compactor chip, and substantially all data transfers from the memory subsystem 200 to the CPU subsystem 100 are decompressed.

Figure 8:
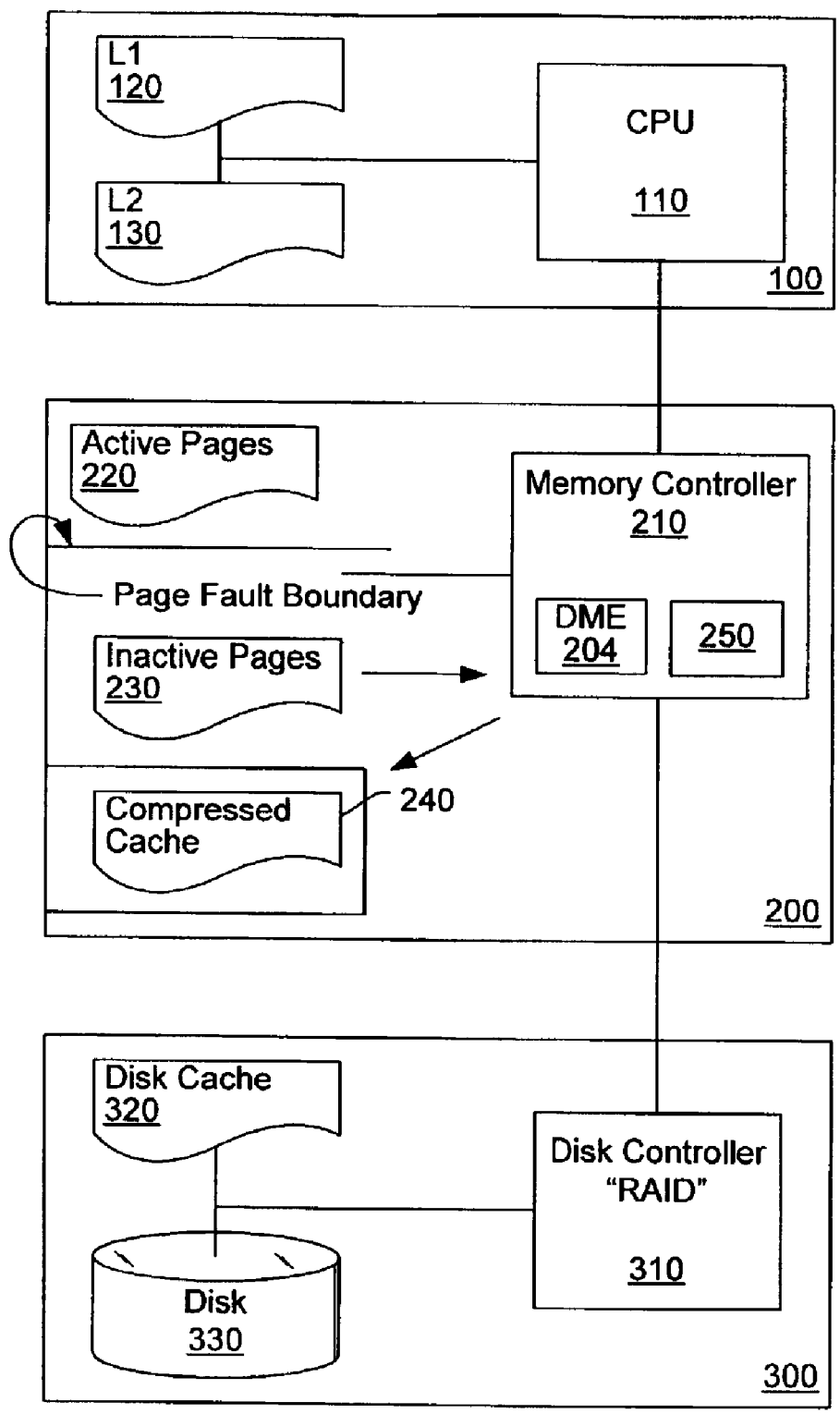
FIG. 8 illustrates the system of FIG. 6 where the functional unit (codec engine) is comprised in the memory controller.

FIG. 8—A Computer System with a Codec Engine in the Memory Controller

FIG. 8 illustrates the system of FIG. 6 wherein the codec engine 250 (also called the compactor chip 250) is comprised as part of the chipset logic, e.g., the system memory controller 211. The embodiment of FIG. 8 corresponds to the embodiments of FIGS. 3B, 4B, and 5B.

As noted above, the system memory 218 may be partitioned by the system software into active pages 220, inactive pages 230, and compressed pages 240, each of which make up components of the total system memory.

As shown, the chipset logic, e.g., the system memory controller 211 includes both the DME 204 and the codec engine, shown as compactor chip 250. In the preferred embodiment, as noted above, the codec engine 250 includes parallel compression and decompression technology as outlined in U.S. Pat. No. 6,208,273 and patent application Ser. Nos. 09/239,658, and 09/491,343 as referenced above. In the embodiment of FIG. 8, the fast parallel compression and decompression operations are accomplished by mounting the compactor chip 250 into the memory controller 211 or other chipset logic.

In this embodiment, the compactor chip 250 acts as a compression and decompression co-processor. The DME 204 operates to transfer data to/from the compactor chip 250, and transfer data between the compactor chip 250 and the system memory 218. The DME operates to control the compactor chip 250 under the direction of the application or C-DIMM driver and other software modules.

In one embodiment, the DME 204 and the compactor chip 250 are tightly integrated as a single unit. Thus the DME may be a "compression enhanced" DME for performing data compression, data decompression, and data movement operations.

As indicated in FIG. 8, under direction of software executing on the CPU 110, the DME 204 operates to perform transfers to compress inactive pages 230 and store the inactive pages in memory in a compressed format. This may be accomplished by a DME read of the non-compressed inactive page 230, followed by the compactor chip 250 compressing and/or decompressing the received data. Then the DME 204 may transfer the compressed data from the compactor chip 250 to the compressed cache 240 memory area. In this case, the VMM 620 may believe that the data was transferred to disk whereas in reality the data was compressed and stored in the CC 240 in system memory.

When the virtual memory manager (VMM) 620 requests a page from disk, the software program executing on the CPU 110 may first examine the CC 240 for resident compressed pages. If the compressed page is resident within the CC 240, the software driver may instruct the DME 204 to read the inactive compressed page from the CC 240, provide the inactive compressed page to the compactor chip 250 for decompression, and then transfer the decompressed page (new active page) from the compactor chip 250 into the area designated by the VMM 620. To the VMM 620 and file system 640, this process looks like a standard disk transfer of a page that had previously been swapped to disk and is read back to the active area of system memory. However, this was actually a fast decompression and read from the CC to the designated active page 220 memory area. Thus, the use of the DME 204, the compactor chip 250 and the allocation of the compressed cache 240 enables orders of magnitude faster response time when reading inactive, cached pages into the main memory 200 active page 220 memory area.

In alternate embodiments, as noted above, the compactor chip may be "in-line" with the data transfer such that data is compressed or decompressed as it traverses between the CPU subsystem 100 and the memory subsystem 200, e.g., as data traverses between the memory controller 211 and system memory 218. The fast parallel compression and decompression operations described above make the "in-line" embodiments feasible, as the compression and decompression of data are performed in "real-time." In one embodiment with an in-line compactor chip, substantially all data transfers from the CPU subsystem 100 to the memory subsystem 200 are compressed by the compactor chip 250, and substantially all data transfers from the memory subsystem 200 to the CPU subsystem 100 are decompressed.

FIG. 9—A Software Stack with Compressed Cache and Compressed Disk Drivers

FIG. 9 illustrates an operating system software stack 600 which includes software programs according to one embodiment. FIG. 9 is described in a context where the compactor chip 250 (also called codec engine 250) is comprised on a memory module, referred to as a C-DIMM memory module.

The virtual memory manager (VMM) 620, the file system (FS) 640, and the disk drivers (DD) 660 make up the conventional prior art operating system stack 600 for control of the memory subsystem 200 and the disk subsystem 300. In one embodiment, to enable the codec engine 250, e.g., C-DIMM 550, for maximum system performance, four blocks are added to the operating system software stack: the file system filter (FSF) 720, the compressed cache manager (CCM) 740, the compressed disk manager (CDM) 800 and the DME device driver (DDD) 500. The FSF 720, the CCM 740, the CDM 800, and the DDD 500 may work together to control data moved by the DME 204. Together these software modules introduce a second level of abstraction to the file system for manipulation of compressed pages in memory and on disk. In addition, alternate embodiments may include control of the DME 204 for compressed page transfers across networks and other communication mediums, or may include use with other functional units 216 which implement algorithms such as data encryption and decryption or other types of in-memory system acceleration.

The software stack may be similar in some operation as the software stack described in the patent applications referenced above. However, in the present embodiment, the CCM is operable to work with physical addresses, not logical addresses. Thus the DME 204 can operate directly with physical memory addresses, avoiding PTE look-ups.

Figure 10:
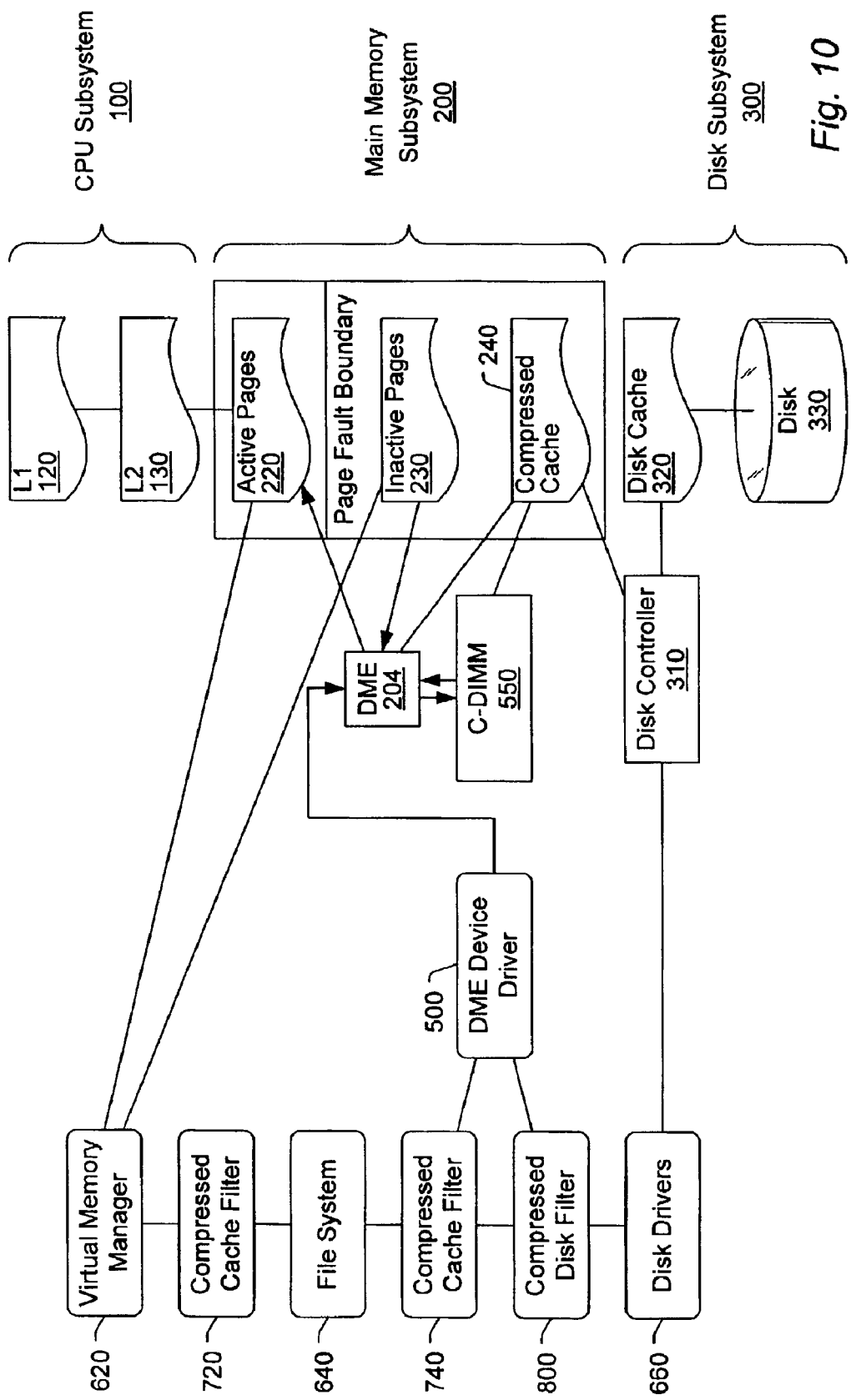
FIG. 10 is a detailed block diagram illustrating the software and hardware interfaces for the C-DIMM component modules pertaining to an embodiment of the present invention.

FIG. 10—Software and Hardware Interfaces for the C-DIMM Component Modules

FIG. 10 indicates one embodiment of flow of operation between the CPU, memory and disk subsystems 100, 200, and 300, and the operating system software including the software stack 600 of FIG. 9. As indicated in the diagram of FIG. 10, the VMM 620 is responsible for allocation of active pages 220 and reallocation of inactive pages 230 in the main memory subsystem 200. The VMM 620 may determine when pages are to be tagged as inactive, when pages are to be moved to the disk subsystem 300, and when pages are to be restored from the disk subsystem 300 to inactive or active memory 220/230. According to one embodiment, the compressed cache manager (CCM) 720 may receive information from the VMM 620 to determine when and how the compressed cache 240 memory partition is manipulated and allocated.

The system may dynamically determine the amount of compressed cache 240 memory that is needed and may dynamically adjust the allocation size of the compressed cache 240. This dynamic adjustment algorithm may use a history of the page swapping operation over a short period under direction of the file system 640 software. The system may use a novel page snooping algorithm, performed by the compressed cache manager 720 block, which examines the number of I/O store and restore requests as a function of time. Thus, when the compressed cache manager (CCM) 720 sees that pages are not being stored as inactive pages 230 (less I/O subsystem activity), or onto the disk subsystem 300, then the CCM 720 software may not allocate system memory to compressed cache pages 240. In the above dynamic allocation algorithm, the compactor chip 250 may not be used as it is assumed that the application fits into the memory subsystem 200 without the need for virtual storage onto disk. As more applications are instantiated, or current applications grow, requiring more memory than available from the memory subsystem 200, the CCM 720/740 may dynamically require the file system to allocate additional memory for the compressed cache 240. Thus, pages are moved by the DME 204 under direction of the file system 640 and the compressed cache manager 740 between the inactive uncompressed page 230 memory area and the inactive compressed page 240 memory area. This procedure may be used during the reallocation of active pages 220 to inactive pages 230 where such pages are targeted for disk storage within the disk subsystem 300. Thus, for active pages that are targeted by the VMM 620 for storage to the disk subsystem 300 by the file system software 640, the system uses the compressed cache manager 720/740, the DME device driver 500, the DME 204, and the codec engine 250, e.g., C-DIMM 550 hardware, to compress and store such pages into the local compressed cache 240 instead of into the disk subsystem 300.

In addition, the compressed cache allocation may use a set of novel cache algorithms to optimize compressed storage for the most active of the stale pages normally swapped to disk. In other words, based on the algorithm of one embodiment, pages that show a history of reuse may be compressed and stored in the compressed cache 240, while pages that show little history of reuse may be compressed and swapped to the compressed page partition in the disk subsystem 300. Thus, as the compressed cache 240 memory becomes full, the dynamic algorithm of the compressed cache manager 720 tags compressed pages according to a novel least recently used, lazy replacement LRU/LZU algorithm and retires low utilization compressed pages into the disk subsystem 300. In an alternate embodiment, the compressed pages that are stored onto the disk subsystem 300 may not be stored in a compressed partition but still may be compressed for faster file transfer and bus I/O bandwidth improvements.

In order to accomplish storage of compressed pages to disk, the system uses another unique filter, the compressed disk manager 800. The compressed disk manager 800 is a software module that may be used like a secondary File Allocation Table (FAT) specifically designed for compressed pages. Thus, the system may retire compressed pages located in the compressed cache 240 buffer to the disk subsystem 300 for storage. In addition, if the compressed disk manager 800 is not installed, the compressed cache manager 740 may call the codec driver 500 to instruct the DME 204 to decompress a stale page prior to storage in the disk subsystem 300. Thus, the performance enhancement when using the compressed disk manager 800 has clear advantages over prior art disk compression technologies.

One embodiment of the present invention also may decompress pages into the system memory subsystem 200 active page region 220 from either the compressed cache 240 memory area or directly from the disk subsystem 300. This process also may require the requests from the operating system software's virtual memory manager 620 for a page of data that the VMM 620 thinks resides in the disk subsystem 300. When a retired page is requested to be reissued to the active page 220 area of the memory subsystem 200, the compressed cache manager 720/740 searches its compressed cache 240 buffer allocation tables in order to see if the requested page is resident in the system memory 200 subsystem, or if the requested page may need to be restored from the disk subsystem 300.

When the compressed page is identified by the CCM 720/720 as being local to the system memory subsystem 200, the process of decompression and page write to the active page area 220 of memory begins. This may be accomplished in a number of steps. First, the compressed cache manager 740 may translate the page address from the file system 640 into an address pointer into the compressed cache 240 memory area. Second, the codec driver 500 is invoked by the CCM 740 to configure command blocks to be executed by the DME 204. The DME 204 may execute these command blocks to read the compressed page from the compressed cache 240 memory area and begin the decompression process. Third, once the decompression of the compressed page is complete, the DME 204 may move the decompressed page to the active page 220 region of the memory subsystem 200. The CCM 740 is then notified that the page decompression and move process has completed by the DME 204, or by the DME device driver 500. The CCM 740/720 then finishes the operation by notification to the file system 640 and finally the VMM 620 is notified that the page is in active page 220 region and is ready for process by the resident application software. Additionally, multiple pages can be strung together such that the above steps are concatenated to streamline the process steps.

In one embodiment, when a compressed page is identified as requiring decompression to the active page area, the system identifies or anticipates other pages that may require decompression in the future, using a type of pre-fetch mechanism.

When the compressed page is not identified by the CCM 720/740 as being resident to the local compressed cache 240 region, then the compressed page may be read and restored to the active page 220 region of the system memory subsystem 200 from the disk subsystem 300. This process may require a call to the compressed disk manager 800 if the page was stored in compressed format on the disk subsystem 300. If the compressed disk manager 800 is installed in the system and the page is located in the compressed disk partition, the compressed disk manager software 800 may translate the disk sector address to the compressed disk partition sector address. Once the compressed disk sector address is determined by a FAT2 (Compressed File Allocation Table) lookup, the DME 204 is configured to read the compressed data from the disk subsystem 300 into compressed cache 240 memory region. To accomplish the initial move, the compressed disk manager 800 module may request from the disk drivers 660 a disk controller 310 operation to retrieve the proper page or pages from the disk subsystem 300. When disk access of compressed pages has finished by indication from the disk drivers 660 to the compressed disk manager 800, the decompression operation of the compressed page may be invoked by a call from the compressed disk manager 800 to the DME device driver 500, and then configuration of command blocks for the DME 204. The DME device driver 500 may initiate the decompression process by prompting the DME 204 to move the compressed page through the compactor chip 250 located, e.g., on the C-DIMM 550 device. The DME 204 reads the coherent decompressed page and then writes that page into the active page 220 area of the memory subsystem 200. Typically, the CPU cache is updated by the read, and application execution can begin immediately. In an alternate embodiment, the write of the decompressed page back to system memory 200 may happen later, restoring the coherent data into the active page 220 region of the system memory subsystem 200. Once the active page is restored to the area allocated by the file system 640 software, the VMM 620 is notified that the active page is now ready for application operation.

If the compressed disk manager 800 is not installed in the system and the page is located in a normal non-compressed disk partition, the system need not invoke the codec driver 500 or the C-DIMM device 550 and may restore the non-compressed page(s) directly into the active page 220 region of the memory subsystem 200, e.g., by using the DME 204. The operation of the VMM 620 and the file system 640 are similar to that described previously when the compressed disk manager 800 was invoked, except that the compressed cache manager 740/720 is preferably not invoked to restore the non-compressed page from disk to the active page 220 region of the memory subsystem 200.

In addition, the same process can be used for network systems where compressed pages are transferred between servers connected on a local area or wide area network. In this alternate embodiment, pages are compressed by the compactor chip under direction of a network driver filter that is similar to the Compressed Disk Partition Manager 800, except that these pages are targeted for sending to remote client or application servers. Compressed data pages can also be sent to other client computers where data can be decompressed by either the compactor chip 250 or a similar derivative, or alternatively by software plug-in modules previously installed in the client end computers.

In addition, the system is not limited to the use of file filters as indicated in the preferred software embodiment, but may have specific operations defined and embedded into the operating system software kernel. Thus, operation may be enabled by specific instructions and routines embedded directly into the kernel of the operating system. Also, the codec driver 500, or the operating system, may have a proprietary callable application specific interface which can be used directly by applications such as database software, CAD tools, and any other application programs when specific compression and decompress tasks are required.

In one embodiment, an Application Programming Interface (API) may be provided with the compressed cache 240 that allows applications running on a system utilizing virtual memory, a compressed cache 240 and CCM to request and be notified of an effective size of memory, thus allowing the application to make memory tuning decisions. Effective space may include uncompressed virtual memory plus the effective space provided by the compressed cache. The compressed cache, for example, may be allocated 1000 pages of physical memory. If the compressed cache provides a 2:1 compression ratio, then the compressed cache provides 2000 pages of effective space. If there are 1000 pages of uncompressed virtual memory available, then the API may notify the application that there are 3000 pages of memory available. In one embodiment, if an application request the amount of physical memory available (as opposed to a virtual memory amount), then the API preferably notifies the requesting application of the true amount of physical memory available. For example, in a system with 64 MB of physical memory, if VM and the CC were allocated a total of 54 MB of physical memory, then the API would return 10 MB as the amount of physical memory available.

Figure 11:
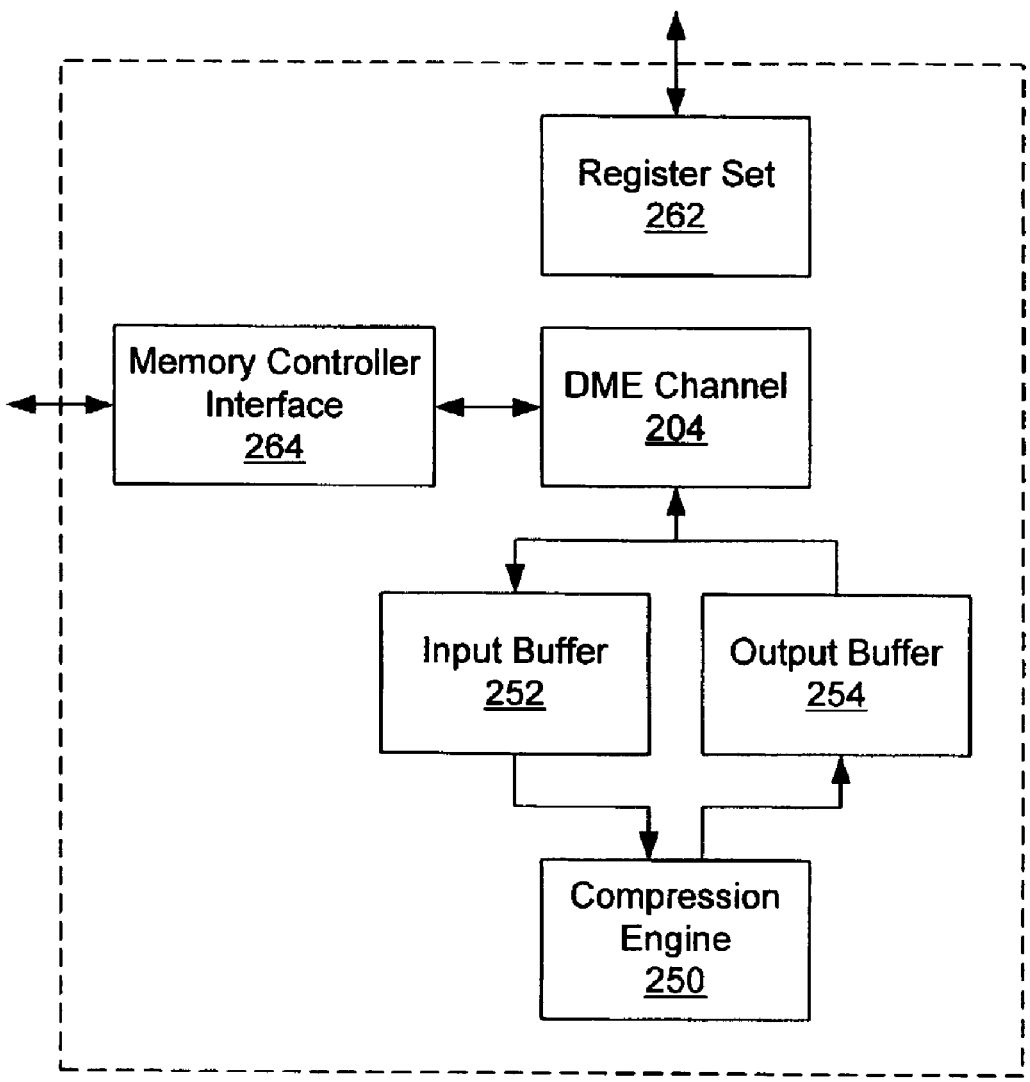
FIG. 11 is a block diagram of the DME/functional unit interface.

FIG. 11—DME/Codec Interface

FIG. 11 is a block diagram which illustrates the DME and codec engine interface. As shown, the system may include a register set 262 for accessing the DME 204, e.g., a DME channel (or DMA channel) of the DME 204. This register set 262 may be used by software to manage the compressed DME channel 204. This register set 262 may comprise PCI registers. As noted above, the codec engine 250 may include an input buffer 252 and an output buffer 254. The input buffer 252 receives data being written to the codec 250 (compressed or uncompressed), and the output buffer 254 receives data output from the codec 250 (uncompressed or compressed, respectively). The input buffer 252 and the output buffer 254 may be considered to be either internal to the codec engine 250 or may be considered as external buffers supporting the codec engine 250. As shown, the DME channel 204 may write data (compressed or uncompressed) to the input buffer 252 and read resultant data produced by the codec 250 (uncompressed or compressed, respectively) from the output buffer 254.

As noted above, the DME 204 may include a single DME channel 204 or multiple DME channels 204. The DME channel 204 may include a split transaction interface to the memory controller 211. The DME 204 also allows out-of-order cache line accesses. The DME 204 also preferably supports scatter/gather compressed DMA transfers, wherein a source/destination page may comprise one or more linked blocks. The blocks may be linked whereby the physical address to the next block is embedded in each block. In one embodiment, an unlimited number of blocks can be linked together. The DME 204 may support block sizes from 128 bytes to 4 Kb.

The DME channel 204 may be operable to concurrently transfer a source page from coherent memory into the input buffer 252 and transfer a destination page from the output buffer 254 to coherent memory. The depth of the buffers 252 and 254 may be optimized for the memory controller 211.

Software executing on the CPU 110 operates to initiate DME transfers. This software may be either software drivers, the operating system, the VMM, or other software. The software executing on the CPU 110 operates to initiate DME transfers by first setting up one or more Command Blocks in coherent memory. Command Blocks describe or specify a DME operation and are described below. The software executing on the CPU 110 then initiates the DMA transfer by writing the first Command Block address into the DME channel 204. The DME channel 204 then performs the transfers specified by the one or more Command Blocks. These transfers may involve compressing and/or decompressing data in system memory, or compressing and/or decompressing data transferred between various devices in the system. When the DME channel 204 completes the transfers, i.e., has executed all of the Command Blocks, then the DME channel 204 updates the Command Block status.

The transfers performed by the DME channel 204 may be coherent transfers, i.e., transfers which may require snooping by the CPU subsystem. In one embodiment, the memory controller 211 handles coherency of DMA operations. The memory controller 211 may also operate to return data from the memory or host bus on a snoop hit.

The codec engine 250 may be a lossless half-duplex compression/decompression engine. The codec engine 250 may operate to compress/decompress one page at a time. The codec engine 250 may provide a decompression rate up to 2.1 GB/sec at 133 MHz, and a compression rate up to 532 MB/sec at 133 MHz. Thus the codec engine 250 may only require approximately 7.5 microseconds to compress a 4 Kb page at 133 MHz. The codec engine 250 may include a scaleable design, which can be optimized for one or more of bandwidth and compression ratio. In the preferred embodiment, the codec engine 250 is implemented on a chip or ASIC with approximately 200 k gates, while providing 532 MB/sec compression/decompression and a 256 byte history buffer or history window (also called a history table).

Figure 12:
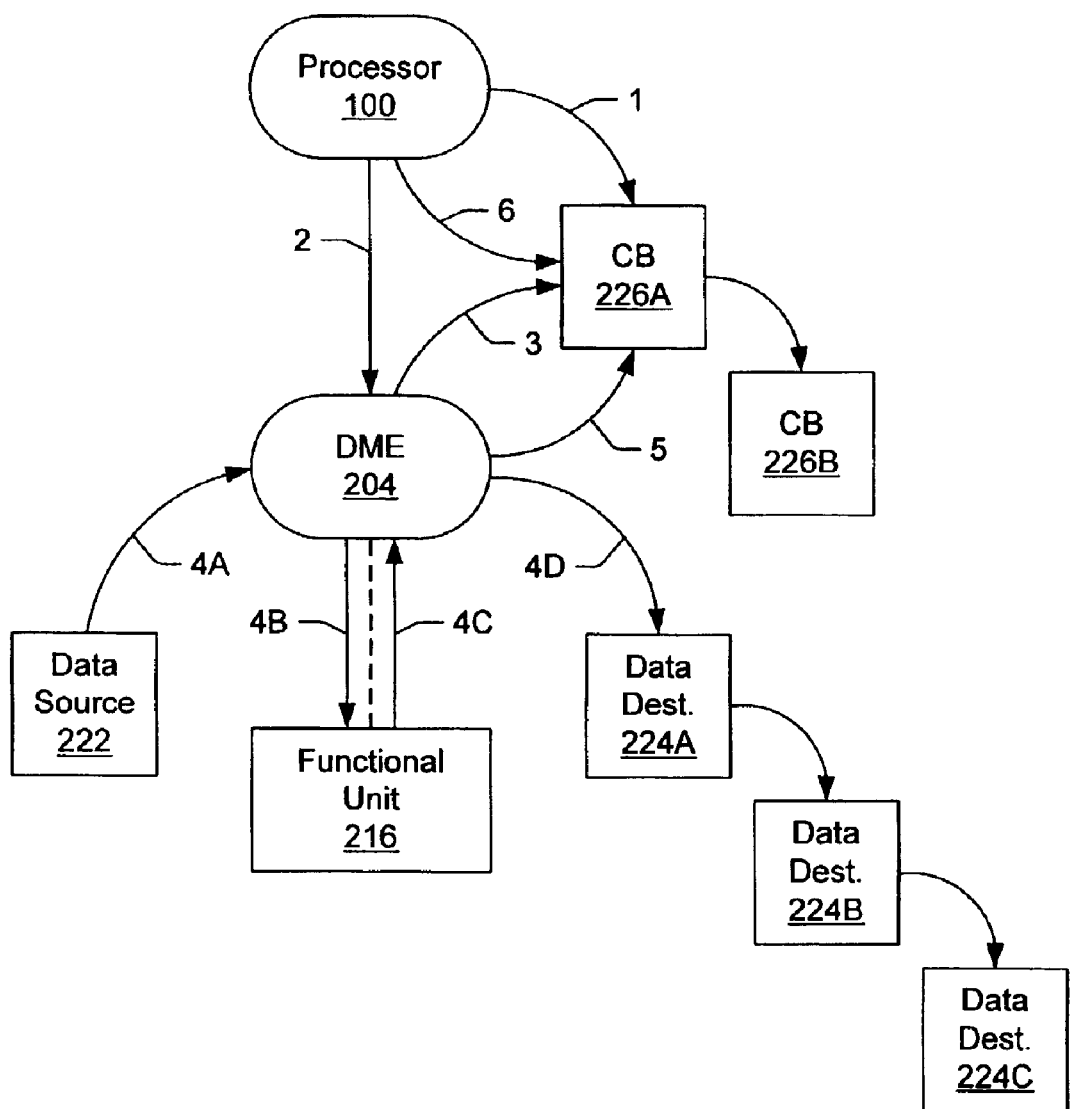
FIG. 12 is a flow diagram illustrating operation of the system.

FIG. 12—Compression and Decompression Operations Using a Data Movement Engine (DME) 204

FIG. 12 illustrates compression and decompression operations using a data movement engine (DME) 204 according to one embodiment of the invention. FIG. 12 illustrates a processor or CPU subsystem 100 which may be coupled to DME 204. The DME 204 may be comprised in chipset logic, the memory controller 211 (which itself may be comprised in the chipset logic), may be comprised in the CPU 100, or may optionally be comprised in the system memory 218, e.g., on a memory module. In the preferred embodiment, the DME 204 is comprised in the system memory controller 211. For example, the DME 204 may be comprised on a North Bridge or South Bridge chip set logic. The DME 204 couples to the system memory 218.

The functional unit 216 may couple to the DME 204. As noted above, the functional unit 216 may comprise a codec (compression/decompression) engine which performs compression and decompression operations. For example, in one embodiment the functional unit 216 is a parallel compression/decompression codec engine. In another embodiment, as noted above, the functional unit 216 may be an encryption/decryption engine for encrypting/decrypting data. The functional unit 216 may be comprised in the memory system 218, e.g., may be comprised on a memory module. In one example where the functional unit 216 is a codec engine 250 comprised on a memory module, the memory module comprising the codec engine 250 is referred to herein as a C-DIMM. In another embodiment, the functional unit 216 may be comprised in the memory controller 211.

In the description of FIG. 12 that follows, it is presumed that the functional unit 216 is a codec engine 250 that is comprised on a memory module (C-DIMM) of the system memory 218. As noted above, the software programs managing the DME 204 and codec engine 250 may be any of various types, such as the operating system, VMM, device drivers, or combinations thereof. For simplicity, the description below presumes that the software programs managing the DME 204 and codec engine 250 include a DME device driver (DDD).

As shown, at step 1 the processor 100 may generate one or more command blocks 226. In one embodiment, the DME device driver 500 executing on the processor 110 operates to cause generation of the command blocks 226. FIG. 12 shows two command blocks 226A and 226B. As shown, the command blocks 226 may be generated as a linked-list format, i.e., may be chained together, as shown. The processor 100 may generate one or more command blocks 226, e.g., may generate a greater number of command blocks 226 as desired.

Each of the command blocks 226 may specify a date of movement operation (e.g., one or more data movement operations) to perform either a data compression operation, and/or a data decompression operation. Where the operation specified by the command block is a compression operation, then in one embodiment the command block may comprise:

1) the start address for the page to be compressed;
2) the size of the page to be compressed;
3) the start address of the destination in main memory 218 where the compressed data is to be stored;
4) a compression/decompression Status Byte (or bytes); and
5) further status information.

The start address for the page to be compressed comprises the start or beginning address of the page in system memory which is desired to be compressed.

The size of the page to be compressed may be the standard operating system page size, e.g., either 4 Kb or 8 Kb. This page size may be set to a default value. It is also noted that this page size may also be set on non-page granularity boundaries, as desired.

The destination start address for the compressed data indicates the beginning address for the destination in system memory 218 where the compressed data is to be stored in main memory 218.

The compression/decompression Status Byte indicates the status of the compression operation being performed, e.g., whether this compression is complete, incomplete, uncompressible, etc. The Status Byte may also indicate an address to the next compressed block on the free list. Thus, where the resultant compressed data is being transferred to multiple different destination locations, these destination blocks may be linked or chained using the Status Byte.

The further status information may indicate other types of compression status, i.e., whether the operation is a compression operation or decompression operation, whether to clear the history window or history buffer, the compression threshold, etc. This other status information may also contain a pointer to the next command block, i.e., the next command block in the linked list.

In one embodiment, the DME device driver 500 executing on the processor 100 operates to generate command blocks 226 in the system memory 218. In another embodiment, the DME device driver 500 executing on the processor 100 causes the command blocks 226 to be generated and transferred to a local memory or command block buffer comprised in the memory controller 211 and coupled closely to the DME 204. In another embodiment, the command blocks 226 are written directly to buffers in the DME 204.

The software executing on the processor 100 then causes the DME 204 at step 2 to begin executing the command blocks 226. The software executing on the processor 100 may write a control register in the DME 204 to cause the DME 204 to begin compressing a page pointed to by a respective command block. In one embodiment, the software provides a start address or pointer to the first command block 226A in the linked list.

The DME 204 may use the start address of the first command block 226 to read the first command block from system memory 218 at step 3 and begin executing the first command block 226. As noted above, each command block 226 may contain a pointer to a subsequent command block in a linked list fashion. Thus, the DME 204 can read and execute the first command block 226A followed by reading an executing the second command block 226B, etc. until all the command blocks in the linked list have been executed. The execution of one command block is described below.

In response to reading the command block and execution of the command block 226, the DME 204 may perform the following operations. As shown at 4A, the DME 204 may read the page that is desired to be compressed from system memory 218, referred to herein as data source 222. Thus, the DME 204 uses the start address for the page to be compressed which is contained in the current command block 226 and performs a read of this page at 4A and then performs a write of this page to the functional unit 216, i.e., the codec engine 216A. Thus, the DME 204 moves a portion of the page from system memory to the input data register or input buffer 252 of the codec engine 216A. The codec engine 216A then begins compressing the data and in turn generates compressed data in its output buffer 254.

The DME 204 may then read the compressed data from the output buffer 254 of the codec engine 250 at 4C and then write this compressed data to one or more destination memory locations 224A, 224B and 224C in the system memory. Here, the DME 204 uses the start address for the compressed data, i.e., the destination start addresses to write the data to the destination system memory. In one embodiment, the DME 204 is a scatter-gather data movement engine (e.g., scatter-gather DMA controller). In this embodiment, the command block may comprise a plurality of destination start addresses for different destination locations in system memory 224A, 224B and 224C. In this embodiment, the DME 204 may operate to write the compressed data to different noncontiguous data destinations or locations in the system memory as represented by 224A, 224B and 224C.

In performing the write operation in 4D, the DME 204 may read a CODEC Status Register. The Status Register may comprise various fields, including Compression/Decompression Status, Bytes Available, and Error indicators, etc. The DME 204 may read the Bytes Available bytes from the codec engine's output data buffer 254 and write them to a compressed data area in main memory. If the bytes to be written exceed the Block Size bytes (possibly minus linked list pointer bytes, then the DMA Controller may stop writing before it overwrites the Link List Pointer contained in the destination memory block; evaluate the Link List Pointer; begin writing at the new location This may involve non-coherent reads from the codec engine's output buffer 254, and coherent writes to main memory.

After the data has been written to a destination, the DME 204 may update the respective command block with status information, shown as step 5. The DME may update the Address Offset Counter with the number of bytes written. If the Status is complete, the Link List Pointer in the current memory block is updated with null pointer to indicate that this is the last block of the linked list entity. The command block may also be updated with the number of blocks written. The coherent update informs the software cache lock that compression is complete. The Block Count may also be updated. This may be used by software to update a monitor of the linked list. The software may observe the Command Block write by its coherent cache lock. If the codec Status was incomplete, then the DME may reads the codec Status Register and may attempt to repeat the read write process.

After the DME 204 updates the respective command block with status information, the DME 204 may begin processing another command block. The processor 100 (e.g., the DDD or CCM) may then later check the status information.

It is noted that, after step 2, the processor 100 may perform other activities independent of the DME 204. In one embodiment, the processor 100 periodically polls for the status completion in step 6. In another embodiment, an interrupt mechanism is used to alert the processor 100 that a respective command block has completed.

It is noted that decompression operations proceed in a similar manner to that described above, except that compressed data is read in 4A, decompressed, and uncompressed data is written in 4D. Various other status checks and updates may also be modified.

Coherent Transfers and Snooping

In one embodiment, the read of the page to be compressed from main memory is a coherent read. In other words, the page being read from the data source 222 in system memory in step 4A is a coherent read, and thus the address of this read operation is provided to the processor 100 during the read for snoop purposes. In addition, any of the data movement operations 4A–4D may comprise coherent reads or writes.

An L1 or L2 cache comprised on the processor 100 may snoop the read address to determine if updated data corresponding to this address is stored in either of the L1 or L2 caches in the processor 100. If a snoop hit occurs, meaning that the cache comprised in the processor contains updated data corresponding to the source address, then the processor 100 may halt this read cycle being performed by the DME engine, and perform a writeback of the updated data to the system memory. The DME read operation may then proceed with reading the new data. In one embodiment, the DME engine may "snarf" or obtain the data that is being written back by the processor cache as the data is provided through the memory controller, so the DME engine 204 is not required to re-read this data once it has been written to system memory.

Streaming of Data

In one embodiment, the DME operation of reading the source data, writing the data to the input buffer 252 of the codec engine 250, reading the data from the output buffer 254 of the codec engine 250, and then writing the compressed data to a destination address, may comprise four data movement operations. In one embodiment, each of these data movement operations may comprise one or more individual data reads or writes, i.e., the data may be streamed from the source data and provided in respective portions to the codec engine, or data may be read from the output buffer of the codec engine as the data becomes available and multiple reads may be performed in 4C and corresponding multiple writes 4D may be performed to the destination address. In one embodiment, the command block includes four coherent status bits for each of the data movement operations 4A, 4B, 4C and 4D. In one embodiment, the default mode is that each of the data movement operations 4A, 4B, 4C and 4D is a coherent read or write operation wherein the address of the respective operation is provided to the processor 100 for snooping purposes. Various bits may be set in respective command blocks to designate certain data movement operations as non-coherent wherein snooping operations are not required.

In one embodiment, the DME 204 may operate to read the data from the data source 202 in 4A as a streaming process. For example, in one embodiment the DME and/or memory controller may have an input buffer sufficiently large to store an entire page of memory. In this embodiment, the DME may read an entire page of memory first in the data movement 4A and then provide the entire page of data in a write operation 4B to the functional unit 216. However, in this embodiment, the codec engine 216A cannot begin compressing the data until the entire block of data has been read in step 4A and at least a; portion of this data has been provided to the input buffer in movement operation 4B. Thus, in one embodiment the DME performs a data read streaming operation in 4A wherein the DME engine 204 reads a first portion of the page, e.g., 1 kb, ½ kb, etc. and then writes this data in step 4B to the input buffer of the codec 216A. Thus, the compression engine 216A can begin compressing the data received at its input buffer 252 while the DME engine 204 is concurrently acquiring more data from the data source 222 in step 4A and then writing more data in step 4B to the input buffer. In a similar manner, the DME 204 may read portions of data from the output buffer of the codec 216A in step 4C as the compressed output data is available and write this data to destination addresses in step 4D. This may allow concurrency of operations between steps 4A and 4B and also between steps 4C and 4D.

In one embodiment, where the DME includes multiple physical busses or channels between the main memory and the functional unit 216, the DME 204 may operate to read data from the data source 222 in system memory on a first memory bus channel concurrently with the DME 204 writing previously read data to the codec 216A in step 4B on a second memory channel. The DME 204 may further be operable to write output compressed data that has been previously received by the DME 204 from the output buffer of the codec 216A to data destinations in the system memory on a third memory channel. It is noted that where there is only a single memory channel to the codec 216A, only one of steps 4B and 4C can operate at any one time although they may operate in a time multiplexed fashion. In another embodiment, the system may include multiple memory channels, e.g., a first memory channel between the DME 204 and the input buffer of the codec 216A and a second memory channel between the DME 204 and the output buffer of the codec 216A.

Figure 12A:
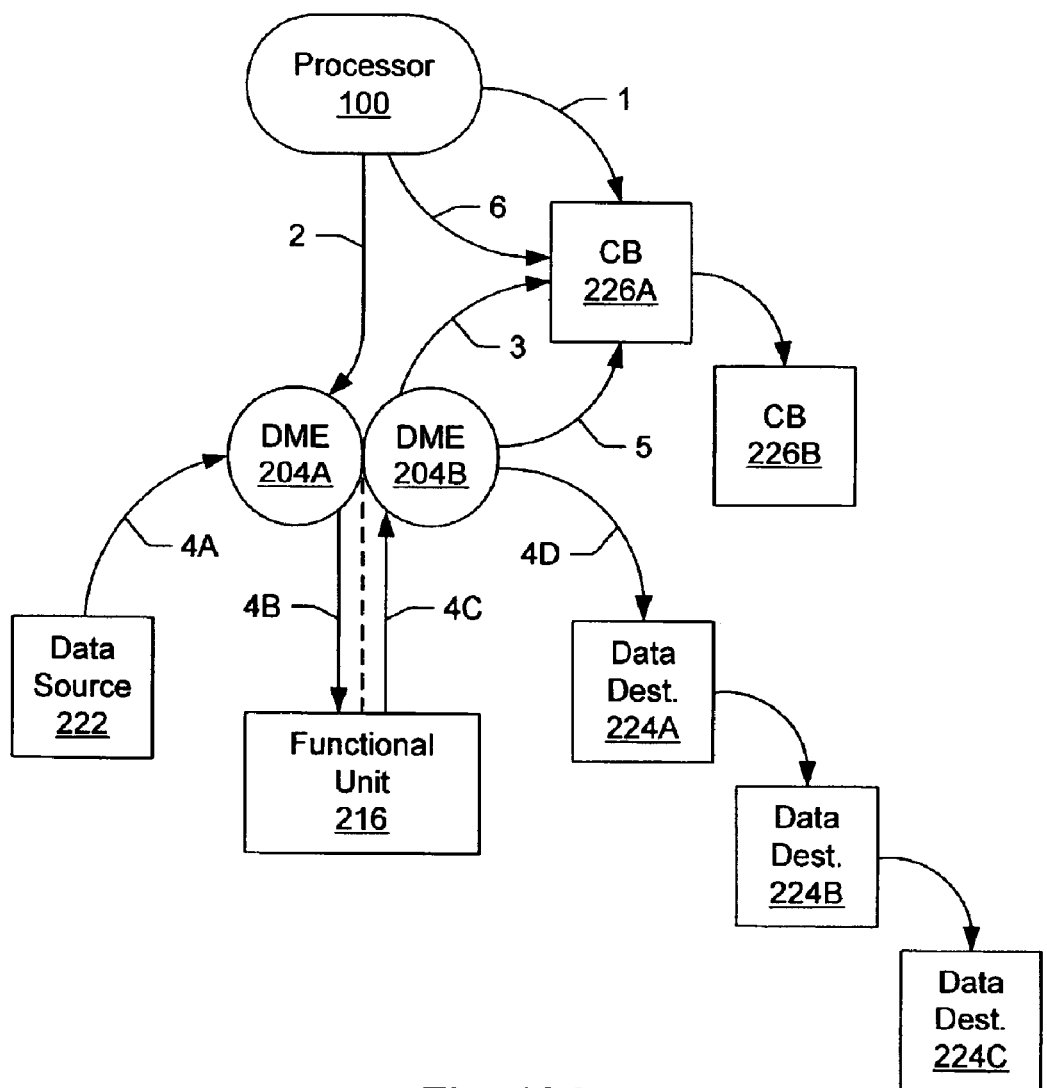
FIG. 12A is a flow diagram illustrating operation which includes two DME engines.

Another embodiment of FIG. 12 includes two DME engines 204A and 204B. The DME engine 204A may be used for transferring data to the input buffer of the codec engine 250, e.g., for reading data from the system memory and writing the data to the input buffer of the codec engine 250. The DME engine 204B may be used for reading data from the output buffer of the codec engine 250, and then writing the received data to a destination. These DME engines 204A and 204B may operate concurrently. This is illustrated in FIG. 12A.

Figure 13:
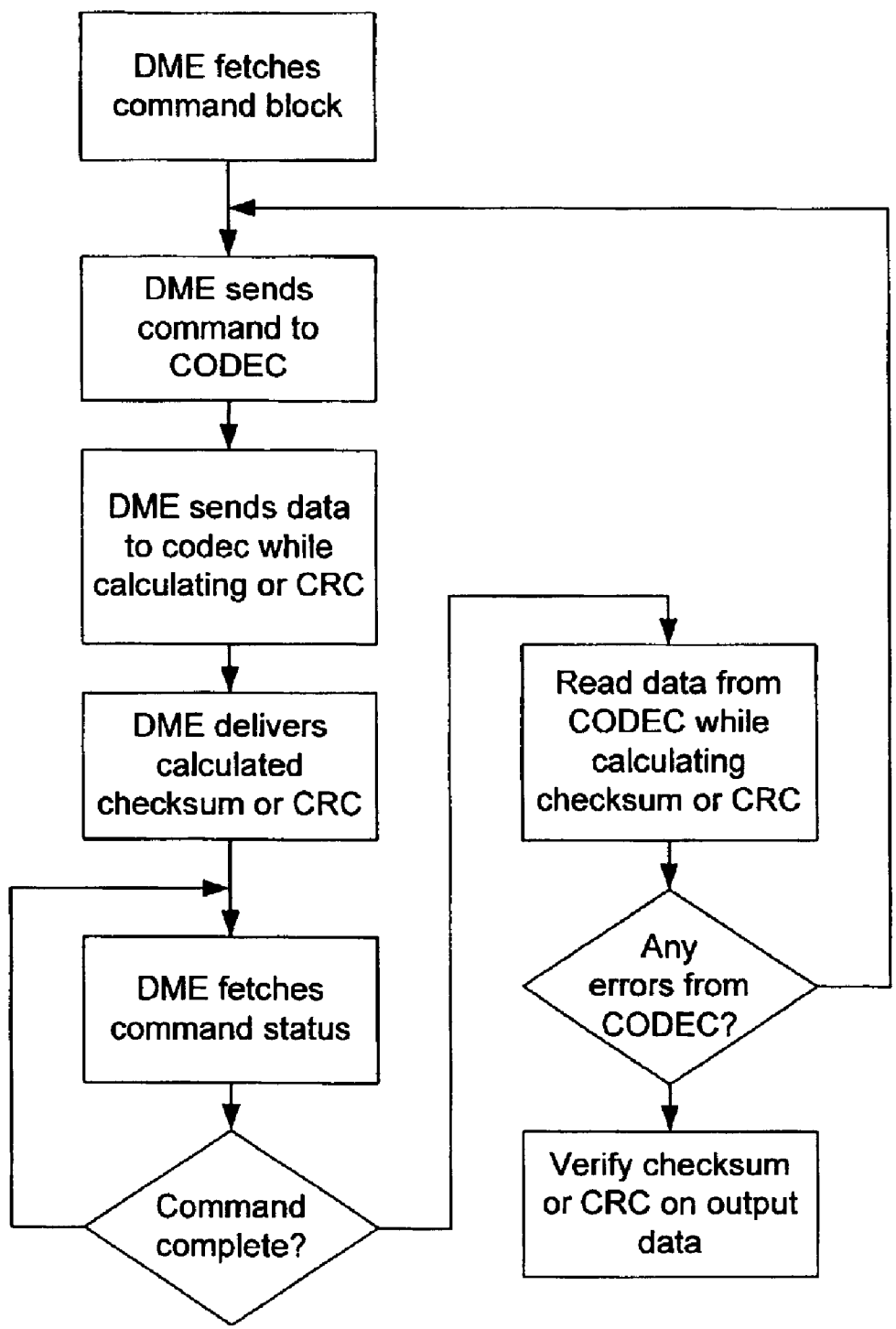
FIG. 13 is a flowchart diagram illustrating operation of the DME.

FIG. 13—Preferred Embodiment of Data Movement Engine (DME)

Figure 14:
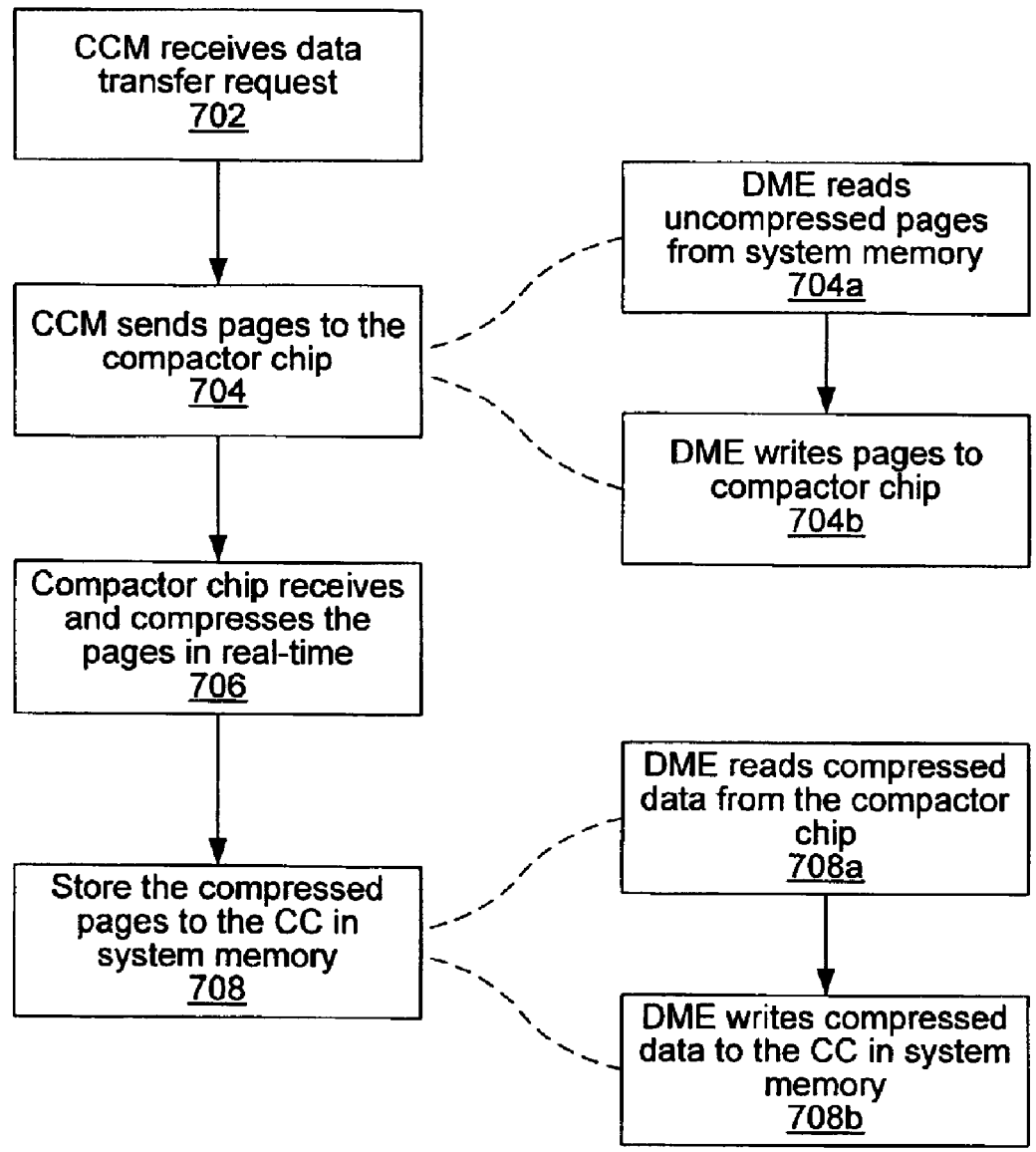
FIG. 14 is a flowchart illustrating compressing and storing data in a compressed cache according to one embodiment of the invention.

Fetch Start Block
        Check for available CODEC (Multiple DIMM System)
        Reserve CODEC
    Deliver Command to CODEC
    Deliver data to CODEC
        Calculate CRC or Checksum on data being delivered
        Manage manage memory controller output queues to ensure data received by CODEC
    Deliver CRC or Checksum to CODEC
    Fetch command status from CODEC
        If not complete, fetch available data and check command status again
        If complete, fetch any remaining data
        Calculate CRC or Checksum on data fetched from CODEC
    Check error codes from CODEC
        If no errors, update command block and indicate complete
        If errors does not require a retry, report error in command block
        If errors require a retry, increment a retry count
            If count less than allowed return to step 2 (Deliver Command)
            Else report bad CODEC in command block and indicate complete FIG. 14—Compressing and Storing Data in a Compressed Cache FIG. 14 is a flowchart illustrating a method of compressing data and storing the compressed data in system memory according to one embodiment of the invention. Steps in the flowchart may occur concurrently or in different orders.

A process, executing on a computer system including a Compactor Chip, a device driver for controlling the DME 204, and a Compressed Cache Manager (CCM), may generate a request to transfer data resident in system memory to nonvolatile memory, such as a disk drive. In one embodiment, the Compactor Chip may reside on a C-DIMM installed as system memory, and the device driver may be a DME device driver. Alternatively, the Compactor Chip 250 may reside on a memory controller 211 in the system. In one embodiment, the process generating the request to transfer data may be a Virtual Memory Manager (VMM) or I/O manager, and the request to transfer may be generated as the result of one of several VMM functions. Examples of VMM functions in a system that may produce a request to transfer data may include, but are not limited to: invalidation of "clean" data that is selected for invalidation using an LRU or other selection scheme, and: writeback of "dirty" data from system memory to nonvolatile memory. Clean data is data that is resident in system memory that has not been touched and/or modified by a process since being originally loaded into system memory or since last being synchronized with the original data on the nonvolatile memory. Dirty data is data that has been touched and/or modified by a process since being originally loaded into system memory or since last being synchronized with the original data on the nonvolatile memory. In a system with virtual memory and a VMM, the data may reside in pages (typically 4096 bytes). Pages may be divided into sectors (typically 256 or 512 bytes). Thus, the VMM may generate a request that one or more pages resident in system memory and being managed by the VMM be moved to nonvolatile memory.

In step 702, the request to move one or more pages of data from system memory to nonvolatile memory may be received by the CCM. In step 704, the CCM may direct or configure the DME 204 to transfer of the one or more pages to the compactor chip 250 to be compressed. Step 104 is expanded into steps 704a and 704b. In step 704a, the DME 204 may read the one or more pages from system memory, and may write the one or more pages to the compactor chip 250 in step 704b. The compactor chip 250 receives the one or more pages and compresses the pages in step 706. The compressed pages are stored in a compressed cache (CC) in system memory in step 708. The storing of the compressed pages in step 708 is expanded into steps 708a and 708b. In step 708a, the DME 204 may read the compressed pages from the compactor chip 250. In step 708b, the DME 204 may write the compressed pages to the compressed cache in system memory 218.

Figure 15:
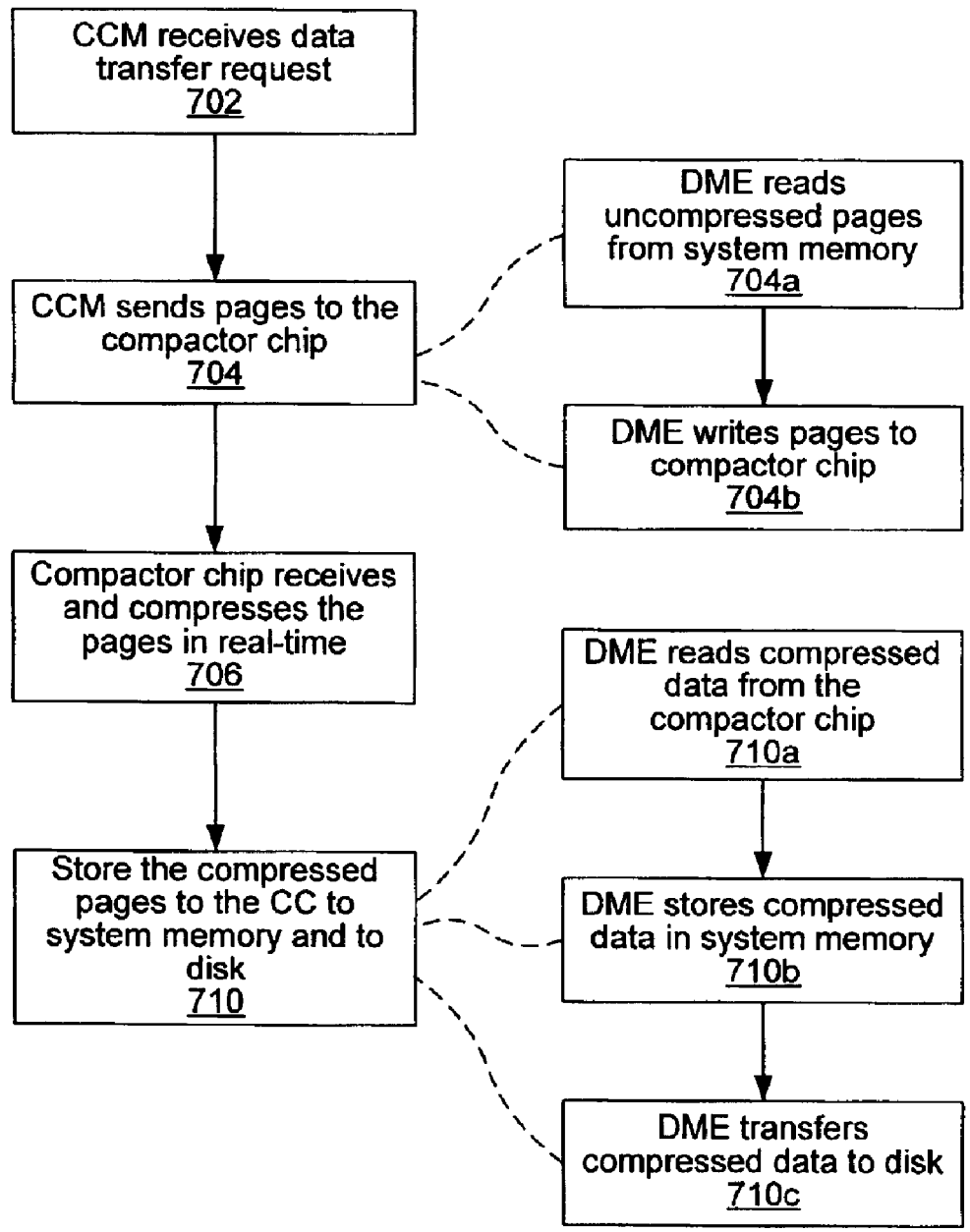
FIG. 15 is a flowchart illustrating compressing and storing data to disk according to one embodiment of the invention.

FIG. 15—Compressing and Storing Data to Disk

FIG. 15 is a flowchart illustrating a method of compressing data and storing the compressed data to nonvolatile memory according to one embodiment of the invention. The method may be implemented in a system such as that described for FIG. 14. Steps in the flowchart may occur concurrently or in different orders.

In step 702, the request to move one or more pages of data from system memory to nonvolatile memory may be received by the CCM. In step 704, the CCM may direct or configure the DME 204 to transfer the one or more pages to the compactor chip 250 to be compressed. Step 704 is expanded into steps 704a and 704b. In step 704a, the DME 204 may read the one or more pages from system memory, and may write the one or more pages to the compactor chip 250 in step 704b. The compactor chip 250 receives the one or more pages and compresses the pages in step 706. The compressed pages may be stored in a compressed cache (CC) in system memory and/or to nonvolatile memory such as a disk drive in step 710. The storing of the compressed pages in step 710 is expanded into steps 710a through 710c. In step 710a, the DME 204 may read the compressed pages from the compactor chip 250. In step 710b, the DME 204 may write the compressed pages to the compressed cache in system memory 218. In step 710c, the CCM may also write the compressed pages to the nonvolatile memory such as a disk drive.

Alternatively to being implemented as software executed on a CPU, the CCM may be implemented in hardware. In one embodiment, the CCM may be implemented as embedded hardware logic on the DME 204, or in the Compactor Chip 250.

Figure 16:
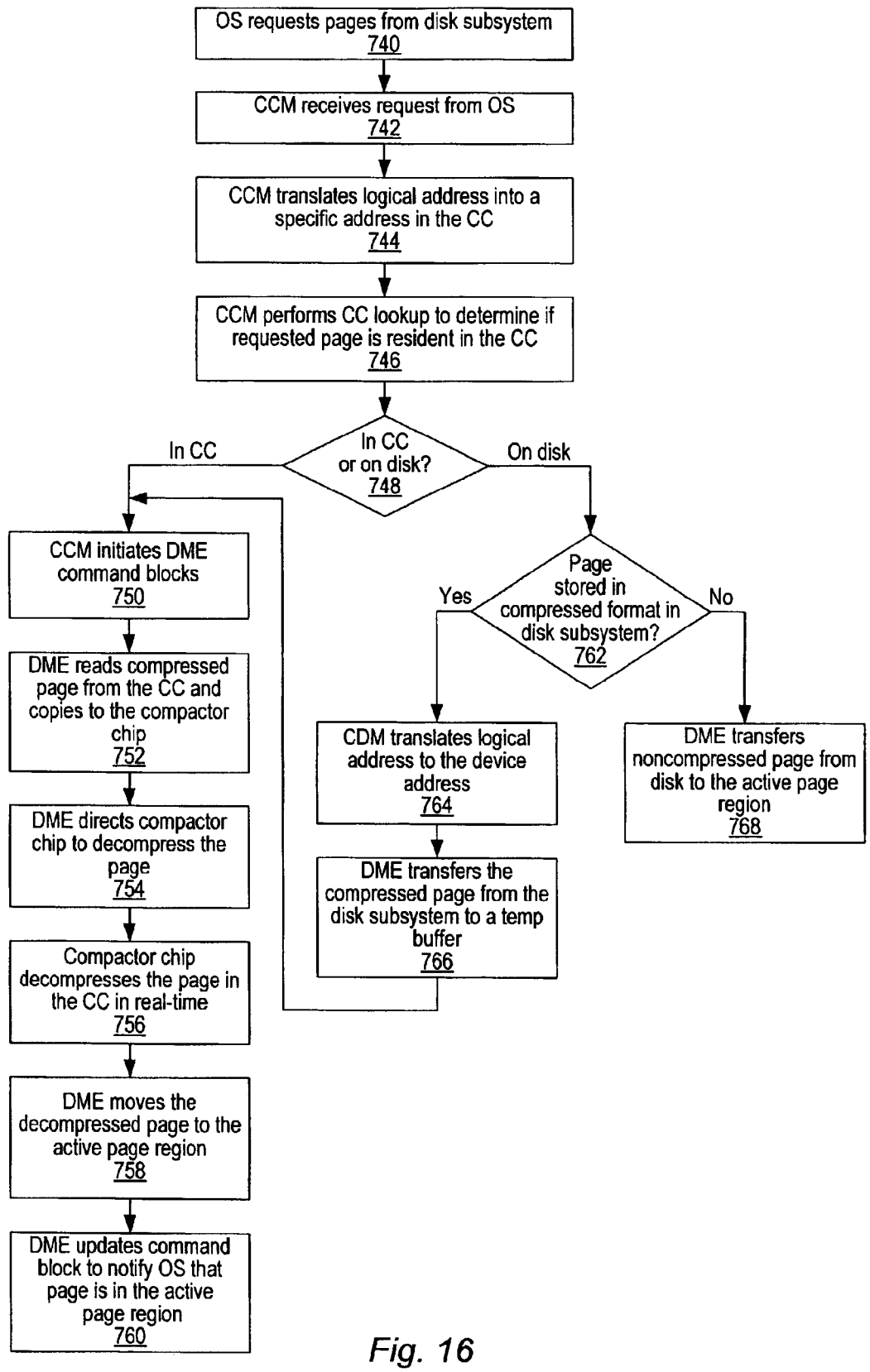
FIG. 16 is a flowchart illustrating the processing of a swap read request according to one embodiment of the invention.

FIG. 16—The Processing of a Swap Read Request

FIG. 16 is a flowchart illustrating a method of processing a read request according to one embodiment comprising a compressed cache and compressed disk. Steps in the flowchart may occur concurrently or in different orders.

In step 740, the operating system (OS) may generate a read request for one or more pages from the disk subsystem. In step 742, the Compressed Cache Manager (CCM) may receive the request generated by the OS in step 740. In one embodiment, the CCM may be installed in a stack of I/O drivers, and the read request may be passed to the CCM from a higher-level driver as part of the processing of the read request. In another embodiment, the CCM may be implemented directly as part of the OS.

In step 744, the CCM may translate the logical address from the read request into a specific address for the Compressed Cache (CC). The CCM may then perform a CC lookup to determine if the requested pages are resident in the CC. In step 748, if the requested pages are resident in the CC, then the method proceeds to step 750. In step 748, if the requested pages are not resident in the CC, then the pages are on disk, and processing may proceed to step 762.

In step 762, if the requested pages are not stored compressed in the compressed disk, then the pages may be read by the DME 204 from the disk and transferred to the active page region of system memory in step 768. If the requested pages are stored in the compressed disk, then the Compressed Disk Manager (CDM) may translate the logical address from the read request into the device address for the compressed disk in step 764. The CDM may then configure the DME 204 to transfer the located compressed pages from the compressed disk on the disk subsystem into a temporary buffer. Preferably, the temporary buffer is in system memory. Processing then may proceed to step 750. Note that, in embodiments without a compressed disk and compressed disk manager, processing may proceed directly from step 748 to step 768, and steps 762–766 may be absent.

In step 750, the CCM may request the DME device driver to configure the DME for decompression of the compressed pages. In response, the DME device driver may configure one or more command blocks. In step 752, the DME 204 reads the compressed pages and writes them to memory on the Compactor Chip 250. The DME 204 may read the compressed pages from the compressed cache if the pages are there, or from the temporary buffer, if the compressed pages were on the compressed disk. The DME 204 may then instruct the Compactor Chip 250 to decompress the compressed pages in step 754, preferably using a parallel decompression method. The Compactor Chip 250 may then decompress the compressed pages in step 756. In step 758, the DME 204 may then move the decompressed pages from the Compactor Chip 250 to the active page region of system memory. In step 760, the DME 204 may notify the OS that the requested pages are in the active page region, e.g., by updating an appropriate command block.

Note that the parallel decompression of the compressed data described in 756 occurs in real-time (i.e., processing does not proceed until the decompression is completed), but due to the speed at which the parallel decompression is performed by the Compactor Chip 250, very little latency in data transfer for the read request is introduced by the decompression. Because the compressed cache allows for more data to be cached in system memory rather than being swapped or written back to disk, and because the data transfer time from disk to memory is about three orders of magnitude longer than from memory to CPU cache memory, any latency introduced by the decompression of the data is greatly outweighed by the performance benefits of reading the data from the compressed cache rather than from the disk subsystem.

Use of the DME with Conventional Memory Controllers

As described above, the DME 204 may be integrated into a memory controller. In one embodiment, the DME 204 is integrated into a conventional memory controller, wherein the memory controller was not designed with the compression/decompression operations of the DME 204 in mind.

In the case where the DME 204 is included in a conventional memory controller, various issues may arise due to the operation of conventional memory controllers. For example, conventional memory controllers include a write queue which is used for posting writes to the system memory. In this write posting operation, data may be written to a write queue of a memory controller and the memory controller may only at some later time submit or perform these writes to the system memory. However, for the purposes of the DME operation with the functional unit 216, especially when the functional unit is a codec engine 250, it is important that the memory controller deliver all the data to the system memory or the functional unit 216 substantially immediately.

A device such as a processor or any bus master which writes data to the memory actually writes the data to the system memory controller, and the data is written to the system memory controller in a certain order. However, a memory controller which includes write queues, e.g., write posting queues, may typically operate to write the data to the system memory at a current or later time and may write the order to the system memory in various orders. Thus, conventional memory controllers are designed where the memory controller is only required to provide the data to the system memory at some time in the future and may provide it regardless of order. However, for a system as described herein which includes a functional unit 216 contained in the system memory, it is important that the data arrive completely to the functional unit 216 before the functional unit 216 processes the respective data. This is because the functional unit will consume the data sequentially.

This is especially true in a compression/decompression operation or in an encryption/decryption operation. For example, in a data compression operation, the codec engine 250 must compress the data sequentially, i.e., must process the data in order or sequentially. This is also true with respect to encryption/decryption, wherein encryption or decryption of data must be performed on the data sequentially and cannot be performed on out of order data.

Therefore, in embodiments of the system described herein used with conventional memory controllers that use write queues and wrote posting techniques, the system may include one or more methods to ensure that data written to the memory controller 211 is completely provided to the functional unit 216. This guarantees that the functional unit 216 can process the data sequentially to guarantee proper operation.

In one embodiment, the DME 204 operates to provide additional write data at the end of a write block to attempt to ensure that the write queues of the memory controller are completely flushed to the functional unit 216. For example, assume the memory block is a 4 Kbyte page and the 4 Kb page is being written by the DME 204 to the functional unit 216. Also assume that the write queues of the memory controller are, e.g., two cache lines. In this case, the DME 204 will write the 4 Kb page, and at the end of this 4 Kb page write will also write an additional 2 cache lines of "dummy data". The additional 2 cache lines of dummy data are written to attempt to flush the write queue of the memory controller of any of the 4 Kb of data. This ensures that all of the data that is intended for the functional unit 216 is actually received by the functional unit 216 during the write operation, and not at some later time.

There are various scenarios involved with accounting for the problem of write queue operation in a conventional memory controller.

In one scenario, the DME 204 and/or one or more of the software drivers knows ahead of time the size or depth of the write queues in the memory controller. In this embodiment, the DME 204 can be configured to write the exact amount or number of cache lines of data to guarantee that the write queues of the memory controller are flushed during writes to the functional unit 216.

In a second scenario, the depth of the write queues in the memory controller are not known. In this case, the DME 204 may iteratively perform additional cache line writes of dummy data followed by a testing or check of status of the memory queue to see if all of the write data has been flushed from the memory controller write queues out to the functional unit 216. One problem with this operation is that it is undesirable for the DME to write more data to the write queue, and inadvertently have some of this dummy data actually flushed to the functional unit 216. Thus, in this embodiment, the DME 204 preferably writes the smallest amount of data, e.g, 1 cache line to the memory controller write queue, and tests to see if all data has been flushed. If not, the memory controller writes an additional cache line and performs a further test, etc., until it determines that all of the "real" data that is desired to be provided to the functional unit 216 is actually provided to the functional unit 216. This second embodiment is more expensive in terms of time cycles and/or bandwidth.

In a third scenario, the DME 204 and/or the software drivers do not know ahead of time the depth of the write queues in the memory controller 211. However, in this embodiment one or more of the software drivers or the DME 204 operate to adaptively learn the depth of the memory controller write queues and then store this information for use later by the DME 204. Thus, for example, on system boot during the driver initialization routine, the driver may test the write queues of the memory controller and determine the exact size or depth of the write queues, and then may program a register in the DME 204 to configure this size values. After the DME 204 is configured, the DME 204 can then write the exact or appropriate amount of cache lines to the memory controller write queue to guarantee that the write queues are flushed during each write to the functional unit 216.

In a fourth scenario, where the DME 204 is comprised in the memory controller 211, the DME 204 may be operable to provide a message to the memory controller requesting or commanding that the memory controller flush its write queues. The DME 204 may also be operable to provide a message to the memory controller directing the memory controller to disable write posting and use of its write queues.

In a fifth scenario, the DME 204 may operate to perform writes to the same address space as is being used by the write queues. This may operate to flush the write queues.

In a sixth scenario, where the DME 204 may or may not be in the memory controller, the DME 204 may perform a read operation to the memory controller of a different address space to cause the memory controller to flush its write queues. If the memory controller 211 is performing cache like functions, i.e., is combining writes and storing them in a cache like memory within the memory controller, then the DME 204 may operate to perform a read of a different address space. These reads of the different address space cause the "cache" in the memory controller to fill up with other data, and thus the LRU/LZU replacement algorithm used in the memory controller would ultimately cause the desired cache lines to be flushed from the memory controller 211.

In another embodiment, the memory controller may be designed specifically to accommodate the DME 204 and its interaction with a functional unit 216 such as a codec engine 250. Thus, the memory controller 211 may be designed to accommodate the operation of the DME and may be designed with knowledge of the functional unit 216. In this embodiment, the DME 204 may be operable to provide a signal or indication to the memory controller, e.g., by setting a bit in a register, which causes the memory controller to flush its write queues. In another embodiment, the DME 204 may be able to selectively turn off write posting or use of data stored in the write queues to guarantee that all data from the memory controller is written through to the functional unit. The operation of the DME 204 providing a signal or setting a bit in the memory controller 211 to flush the write queues may be referred to as a "synchronization command", a "fence command" or a "flush command".

DME Error Reporting

In one embodiment, the DME 204 includes the ability to handle errors that are reported from the functional unit 216. The errors may be reported from the functional unit 216 through status information at completion or during a command being executed by the DME on the functional unit 216. Types of errors that may be reported by the functional unit 216 include data transfer errors or functional data errors, such as a decompression stream that could not properly be decompressed. The DME 204 may operate to notify the software through an update in the command block that the error occurred. Alternatively, the DME 204 may retry the command completely by re-executing the entire command functional block to the functional unit 216, thereby trying to avoid the error in an additional try. The DME 204 may include a counter that is incremented each time this retry is performed. Once the counter reaches an agreed to point, the DME 204 may abandon that command and report back through the command block to the software that the command was unexecutable.

Functional Unit Protocol Configuration

As described herein, the functional unit 216 may include an established predefined protocol wherein the DME 204 communicates with the functional unit 216 using this protocol. However, future versions of the functional unit 216 may include a slightly modified or different protocol. Thus, in one embodiment, the DME 204 is programmable though software to account for two or more possible protocols of various function units 216. In one embodiment, during initialization, the software may detect the type of the functional unit 216 present in the system. The software may then program the DME 204 accordingly to ensure that the DME 204 can communicate properly with the respective version of the functional unit 216 comprised in the system.

With respect to the command block, in one embodiment the command block includes a header which points to subsequent command blocks in the linked list. The DME 204 may include a pointer that points to the command block header, instead of pointing to the first link listed block of data. Thus the DME could use the header pointer which points to the first block as a location to store compressed data.

Compression Ratio Sampling

The DME 204 may include a mechanism to very quickly determine the compression ratio of a particular page. The system may support a special command block which is not involved with two memory copies. In other words, the purpose of the special command block is not to move the data from some source to some destination. Instead, the purpose is to just read the source data, write it into the codec, compress it, and use this transaction to determine the compression ratio.

The DME 204 may also optionally handle "no bloat support". In the event that the compressed results are larger than the original results, the DME 204 is responsible for transferring the uncompressed data directly to the destination, but as link listed blocks. The DME 204 may also include a mechanism to support a minimum compression threshold. In the event that the codec 250 does not yield a minimum compression ratio, then DME would detect the status and choose not to complete the transfer. Instead, the DME 204 would notify the command block that the operation failed and that the operation failed due to not meeting the compression threshold requirements.

Another type of command block op code would be direct DME support where data could be moved directly from a gather source to a scatter destination, thus bypassing the codec. The DME 204 could also optionally provide zero fill support. Zero fill support is a special command block that allows the DME to zero fill a page. In this case the command block would only mention a destination location and the DME would respond by filling that destination with a specific pattern.

Miscellaneous Notes

The user of linked lists to specify command blocks provide numerous capabilities.

First, linked lists allow OS (e.g., NT) operations to scale when a first processor (or first thread) wants to perform a command, and a second processor (or second thread) wants to initiate a transfer, the second processor must wait until the first operation is complete. Now the second processor (or second thread) can simply add an additional command block to the link list and then perform other operations, allowing the first processor (first thread) to proceed. The addition of another command block to the linked list allows the DME to perform the data movement(s) at a future point in time.

Link listing command blocks also allows a driver or application to perform a number of compressed transfers. For example, if it is desired to compress an arbitrary sized buffer that is much larger than a basic 4 Kb compression block, linked listed command blocks allow the driver to perform a larger logical compression. The command block may include mechanisms to decide whether to reset the history window or not. Optionally the software could chose to string a number of command blocks, and hence a number of compression operations, and optionally not reset the history buffer between each link listed command, hence creating a logical larger compression. The larger logical compression may provide improved compression ratios.

An optional mechanism can be added to the DME in the event that there are multiple functional units 216 that could be used at any time. The command block may only indicate the type of function that needs to be performed. The DME could chose one of N functional units 216 and have a mechanism to atomically reserve use of the selected functional unit 216. Today this atomic use of a DME and functional unit is done as a software mechanism. However, in an alternate embodiment, a more intelligent DME may be operable to negotiate for and obtain the use of a particular functional unit 216.

As described in the parent application, an aperture function may be used to enable a device to control the functional unit 216. The aperture may be an aperture in the system memory address space, wherein reads or writes to this aperture are understood to be for the purpose of controlling the functional unit 216. In one embodiment, the aperture function may be part of the DME. When the DME 204 accesses the functional unit 216, meaning the DME 204 is either writing data into the functional unit 216 or reading data from the functional unit 216, the DME may include a mechanism for instructing the memory controller to bypass caches, write queues or cache like structures, to bypass chip kill capabilities, 16 byte ECC capabilities, or instruct the memory controller to provide a bus turn around cycle in the event that the functional unit 216 is sharing a chip select or bus with other devices such as memory.

The following are features that may be used in various embodiments of the invention:
  Configure/support capabilities
  Null terminated or circular link-listed coherent command blocks
    Optimize MP
    Groups of operations by single processor
  Scatter-gather
  Null terminated link-listed data blocks using physical addresses
  Selective coherent transfers
  Two memory copies
  One or more DMA channels per DME
    One for input buffer, one for output buffer
    DMA channel for each memory channel [optional]
  Multiple DMEs for MP
  Auto-hysteresis support to input buffer [optional]
  Data ready support from output buffer
  Error/warning notification to command blocks
  Auto-retry support [optional]
  Couple to memory module based CODECs, motherboard CODECs, memory controller integrated CODECs, etc.
  DME can be in memory controller, processor or I/O bridge
  Interrupt mechanism [optional]
  Dual memory controller considerations. Inter-controller transfers [optional]
  PCI registers
  Touch DMA engine to execute Command Blocks
  DMA channels may contain buffers to perform complete reads instead of streaming data [optional]
  Only use appropriate number of link-listed destination blocks
  Extra chip selects to allow DME to directly access CODECs (there may be no memory behind the CODEC)
  8B ECC, 32b CRC, checksum, etc.
  Handling two or more CODECs (over read) [optional]
  Use it for third party DMA [optional]
  Use pointer if compressed page fits in pointer [optional]
  Compression ratio sampling [optional]
  No bloat support [optional]
  Compression threshold support [optional]
  SDR, DDR and future-specifics CODEC support
  Direct DMA support (bypass CODEC) [optional]
  Zero fill support [optional]
  Bypass cache or cache-like behavior
  Bypass deep store queues
  Bypass chip kill
  Bypass 16B ECC
  Add bus turnaround cycle
  Initiate command to CODEC
  Arbitrary transfer size
  Mechanism for one of N DMEs to atomically reserve and use functional unit
Register Description
CODEC Enable(s)
  Written by BIOS to identify number of CODECs in operation
  Each independent CODEC will have its own enable
    Two CODECs, properly positioned with one on each memory channel, may be a single logical entity
    two memory channels may utilize a double-barrel DMA controller.
Command Block Status Register(s)
  Written by software to initiate action
    When written, causes DMA Controller to (1) Compress or (2) Decompress a block.
    DMA Controller clears register upon action completion.
  Each independent CODEC has its own control register
Command Status Register
  Used by DMA Controller to access in-process compression/decompression
  Each independent CODEC will have a pointer to its Status Register
  (may simply be a known offset from its BAR)
Virtual Aperture Pointer Register
  Used to set aside a memory space, e.g., 256 kb in logical RAM memory for CODEC control, data, and status.
  Each independent CODEC will have an associated 64 bit aperture pointer for physical access by the DMA Controller
Physical Aperture Pointer Register
  Physical Address in main memory for CODEC
    Accesses by software to the BAR are translated by the northbridge based on this register
Command Block Pointer(s)
  Pointer for DMA Controller to Command Block
  One for each independent CODEC Block Size Descriptor
  Size of blocks used for holding compressed data
  128 to 4 k
  Managed as a set of linked list entities
  Link list pointers are the last "n" bytes of the block
Pointer Size Descriptor
  Number of bytes "n" used for the link list pointer (e.g. 4 or 8)
Address Offset Counter(s)
  Counter used to track number of bytes written by CODEC
  For large pages indicates offset into page being written
Block Count(s)
  Number of (link list) blocks written during compression
  Updated by DMA Controller at end of compression
  The next address may be designed so that the software does not have to map and walk the linked list during clean. Just want to update some boundary pointers.
Use of Methods described in U.S. patent application Ser. No. 09/550,380

As noted above, the present application is a continuation-in-part of U.S. patent application Ser. No. 09/550,380 titled "Parallel Compression/Decompression System and Method for Implementation of In-Memory Compressed Cache Improving Storage Density and Access Speed for Industry Standard Memory Subsystems and In-Line Memory Modules" filed on Apr. 14, 2000. This application is also incorporated by reference in its entirety as though fully and completely set forth herein. Any of the methods of application Ser. No. 09/550,380 may be used in the system described herein for managing the functional unit 216 (e.g., codec engine 250) and/or compressed cache 240.

Parallel Compression/decompression Engine

The compactor chip may include parallel data compression and decompression engines, designed for the reduction of data bandwidth and storage requirements and for compressing/decompressing data at a high rate. The parallel compression/decompression engine may be included in any of various devices, including a memory controller; memory modules; a processor or CPU; peripheral devices, such as a network interface card, modem, IDSN terminal adapter, ATM adapter, etc.; and network devices, such as routers, hubs, switches, bridges, etc., among others. In the present embodiment, the parallel compression and decompression engine may be included on a Compactor Chip 250 comprised on a memory module as described above. As noted above, in one embodiment, the Compactor Chip may be integrated on a DIMM, wherein a DIMM with integrated Compactor Chip may be referred to as a C-DIMM. A data movement engine (DME) 204 may be included in the system for interfacing with the Compactor Chip 250. A DME driver may be provided to enable programs, drivers, and other software executing on a system comprising a Compactor Chip to utilize the parallel compression and decompression engines on the Compactor Chip. In one embodiment, the driver may be referred to as the DME device driver (DDD).

When the Compactor Chip 250 is included in a system, data transfers on the system may be in either two formats: compressed or normal (non-compressed). Compressed data from system I/O peripherals such as the nonvolatile memory, floppy drive, or local area network (LAN) may be decompressed on the Compactor Chip 250 and stored into memory or compressed on the Compactor Chip 250 and saved in memory (volatile or nonvolatile) in compressed format. Data may be saved in either a normal or compressed format, retrieved from the memory for CPU usage in a normal or compressed format, or transmitted and stored on a medium in normal or compressed format.

The Compactor Chip 250 preferably includes parallel compression and decompression engines designed to process stream data at more than a single byte or symbol (character) at one time. These parallel compression and decompression engines modify a single stream dictionary based (or history table based) data compression method, such as that described by Lempel and Ziv, to provide a scalable, high bandwidth compression and decompression operation. The parallel compression method examines a plurality of symbols in parallel, thus providing greatly increased compression performance.

Parallel Compression

The parallel data compression engine and method included on the Compactor Chip operate to perform parallel compression of data. In one embodiment, the parallel compression method first involves receiving uncompressed data, wherein the uncompressed data comprises a plurality of symbols. The method also may maintain a history table comprising entries, wherein each entry comprises at least one symbol. The method may operate to compare a plurality of symbols with entries in the history table in a parallel fashion, wherein this comparison produces compare results. The method may then determine match information for each of the plurality of symbols based on the compare results. The step of determining match information may involve determining zero or more matches of the plurality of symbols with each entry in the history table. The method then outputs compressed data in response to the match information.

In one embodiment, the method maintains a current count of prior matches which occurred when previous symbols were compared with entries in the history table. The method may also maintain a count flag for each entry in the history table. In this embodiment, the match information is determined for each of the plurality of symbols based on the current count, the count flags and the compare results.

The step of determining match information may involve determining a contiguous match based on the current count and the compare results, as well as determining if the contiguous match has stopped matching. If the contiguous match has stopped matching, then the method updates the current count according to the compare results, and compressed data is output corresponding to the contiguous match. The step of determining match information may also include resetting the count and count flags if the compare results indicate a contiguous match did not match one of the plurality of symbols. The count and count flags for all entries may be reset based on the number of the plurality of symbols that did not match in the contiguous match.

For a contiguous match, the output compressed data may comprise a count value and an entry pointer. The entry pointer points to the entry in the history table that produced the contiguous match, and the count value indicates a number of matching symbols in the contiguous match. The count value may be output as an encoded value, wherein more often occurring counts are encoded with fewer bits than less often occurring counts. For non-matching symbols that do not match any entry in the history table, the non-matching symbols may be output as the compressed data.

The above steps may be repeated one or more times until no more data is available. When no more data is available, compressed data may be output for any remaining match in the history table.

The Compactor Chip may be used to perform parallel compression, operating on a plurality of symbols at a time. In one embodiment, the parallel compression method accounts for symbol matches comprised entirely within a given plurality of symbols, referred to as the "special case". Here presume that the plurality of symbols includes a first symbol, a last symbol, and one or more middle symbols. The step of determining match information includes detecting if at least one contiguous match occurs with one or more respective contiguous middle symbols, and the one or more respective contiguous middle symbols are not involved in a match with either the symbol before or after the respective contiguous middle symbols. If this condition is detected, then the method selects the one or more largest non-overlapping contiguous matches involving the middle symbols. In this instance, compressed data is output for each of the selected matches involving the middle symbols.

The compression circuit on the Compactor Chip may include an input for receiving uncompressed data, a history table, a plurality of comparators, a memory, match information logic, and an output for outputting compressed data. The input receives uncompressed data that comprises a plurality of symbols. The history table comprises a plurality of entries, wherein each entry comprises at least one symbol. The plurality of comparators are coupled to the history table and operate to compare a plurality of symbols with each entry in the history table in a parallel fashion, wherein the plurality of comparators produce compare results. The memory maintains a current count of prior matches that occurred when previous symbols were compared with entries in the history table. The memory may also maintain a count flag or value for each entry in the history table. The match information logic is coupled to the plurality of comparators and the memory and operates to determine match information for each of the plurality of symbols based on the current count, count flags and the compare results. The output is coupled to the match information logic for outputting compressed data in response to the match information.

Parallel Decompression

The parallel decompression engine and method implemented on a Compactor Chip operate to decompress input compressed data in one or more decompression cycles, with a plurality of codes (tokens) typically being decompressed in each cycle in parallel. A parallel decompression engine may include an input for receiving compressed data, a history table (also referred to as a history window), and a plurality of decoders for examining and decoding a plurality of codes (tokens) from the compressed data in parallel in a series of decompression cycles. A code or token may represent one or more compressed symbols or one uncompressed symbol. The parallel decompression engine may also include preliminary select generation logic for generating a plurality of preliminary selects in parallel. A preliminary select may point to an uncompressed symbol in the history window, an uncompressed symbol from a token in the current decompression cycle, or a symbol being decompressed in the current decompression cycle. The parallel decompression engine may also include final select generation logic for resolving preliminary selects and generating a plurality of final selects in parallel. Each of the plurality of final selects points either to an uncompressed symbol in the history window or to an uncompressed symbol from a token in the current decompression cycle. The parallel decompression engine may also include uncompressed data output logic for generating the uncompressed data from the uncompressed symbols pointed to by the plurality of final selects, and for storing the symbols decompressed in this cycle in the history window. The decompression engine may also include an output for outputting the uncompressed data produced in the decompression cycles.

The decompression engine may be divided into a series of stages. The decoders may be included in a first stage. The preliminary select generation logic may be included in a second stage. The final select generation logic may be included in a third stage. The output logic may be included in a fourth stage.

Decompression of compressed data may begin in the decompression engine when the decompression engine receives a compressed input stream. The compressed input stream may then be decompressed in parallel in one or more decode (or decompression) cycles, resulting in a decompressed output stream.

In a decompression cycle, a plurality of tokens from the compressed data stream may be selected for the decompression cycle and loaded in the decompression engine, where N is the total number of decoders. The tokens may be selected continuously beginning with the first token in the input data stream. A section may be extracted from the compressed data stream to serve as input data for a decompression cycle, and the tokens may be extracted from the extracted section. For example, a section of four bytes (32 bits) may be extracted. A token may be selected from an input section of the input data stream for the decompression cycle if there is a decoder available, and if a complete token is included in the remaining bits of the input section. If any of the above conditions fails, then the decompression cycle continues, and the token that failed one of the conditions is the first token to be loaded in the next decompression cycle.

As the tokens for the decompression cycle are selected, the tokens are passed to the decoders for decoding. One decoder may process one token in a decompression cycle. The decoders may decode the input tokens into start counts, indexes, index valid flags, and data valid flags, with one copy of each from each decoder being passed to the next stage for each of the output bytes to be generated in the decompression cycle. The original input data bytes are passed from the decoders for later possible selection as output data. A data byte is valid only if the token being decoded on the decoder represents a byte that was stored in the token in uncompressed format by the compression engine that created the compressed data. In this case, the uncompressed byte is passed in the data byte for the decoder, the data byte valid bit for the decoder is set, and the index valid bit for the decoder is cleared.

Next, the information generated by the decoders is used to generate preliminary selects for the output bytes. Overflow bits are also generated for each preliminary select. The preliminary selects and overflow bits are passed to the next stage, where the overflow bits are inspected for each of the preliminary selects. If the overflow bit of a preliminary select is not set, then the contents of the preliminary select point to one of the entries in the history window if the index valid bit is set for the output byte, or to one of the data bytes if the data byte valid bit is set for the output byte. Preliminary selects whose overflow bits are not set are passed as final selects without modification. If the overflow bit is set, then the contents of the preliminary select are examined to determine which of the other preliminary selects is generating the data this preliminary select refers to. The contents of the correct preliminary select are then replicated on this preliminary select, and the modified preliminary select is passed as a final select.

The final selects are used to extract the uncompressed symbols. The final selects may point to either symbols in the history window or to data bytes passed from the decoders. The uncompressed symbols are extracted and added to the uncompressed output symbols. A data valid flag may be used for each of the output data symbols to signal if this output symbol is valid in this decompression cycle. The uncompressed output data may then be appended to the output data stream and written into the history window.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for managing memory in a system including a CPU, a data movement engine (DME), and one or more memory modules comprising system memory, wherein at least one memory module includes a compression engine, the method comprising:

the data movement engine reading first data from the system memory;

the data movement engine writing the first data to the compression engine;

the compression engine included on the at least one memory module compressing the first data to form a first compressed data;

the data movement engine reading the first compressed data from the at least one memory module; and the data movement engine writing the first compressed data to the system memory.

2. The method of claim 1, wherein the system further includes a nonvolatile memory, the method further comprising:

the data movement engine transferring the first compressed data from the system memory to the nonvolatile memory.

3. The method of claim 2, wherein said transferring comprises:

the data movement engine reading the first compressed data from the system memory; and the data movement engine writing the first compressed data to the nonvolatile memory.

4. The method of claim 2, wherein the data movement engine transfers the first compressed data from the system memory to a compressed portion of the nonvolatile memory.

5. The method of claim 1, wherein at least one memory module includes a decompression engine, wherein the system further includes a nonvolatile memory, the method further comprising:

the decompression engine included on the at least one memory module decompressing the first compressed data to form the first data;

the data movement engine transferring the first data from the system memory to the nonvolatile memory.

6. The method of claim 5, further comprising:

removing the first compressed data from the system memory after said decompressing the first compressed data to form the first data.

7. The method of claim 6, further comprising:

calculating a usage rate of the first compressed data; and comparing the usage rate of the first compressed data to a minimum usage rate;

wherein said removing the first compressed data from the system memory is performed in response to the usage rate of the first compressed data being below the minimum usage rate.

8. The method of claim 1, wherein at least one memory module includes a decompression engine, wherein the system further includes a nonvolatile memory, the method further comprising:

the data movement engine reading the first compressed data from the system memory;

the data movement engine writing the first compressed data to the at least one memory module;

the decompression engine included on the at least one memory module decompressing the first compressed data to form the first data;

the data movement engine transferring the first data to the nonvolatile memory.

9. The method of claim 8, wherein said transferring comprises:

the data movement engine reading the first data from the at least one memory module; and the data movement engine writing the first data to the nonvolatile memory.

10. The method of claim 8, further comprising:

removing the first compressed data from the system memory after said reading the first compressed data from the system memory.

11. The method of claim 10, further comprising:

calculating a usage rate of the first compressed data; and comparing the usage rate of the first compressed data to a minimum usage rate;

wherein said removing the first compressed data from the system memory is performed in response to the usage rate of the first compressed data being below the minimum usage rate.

12. The method of claim 1, wherein the data movement engine writes the first compressed data to a first compressed portion of the system memory.

13. The method of claim 12, wherein the first compressed portion of the system memory comprises an older first compressed data prior to said writing the first compressed data to the first compressed portion of the system memory; and wherein writing the first compressed data to the first compressed portion of the system memory comprises:

replacing the older first compressed data with the first compressed data in the first compressed portion of the system memory.

14. The method of claim 12, wherein the system further includes a nonvolatile memory, the method further comprising:

the data movement engine transferring the first compressed data from the first compressed portion of the system memory to the nonvolatile memory.

15. The method of claim 12, wherein said transferring comprises:

the data movement engine reading the first compressed data from the first compressed portion of the system memory; and the data movement engine writing the first compressed data to the nonvolatile memory.

16. The method of claim 12, wherein the at least one memory module includes a decompression engine, wherein the system further includes a nonvolatile memory, the method further comprising:

the data movement engine reading the first compressed data from the first compressed portion of the system memory;

the data movement engine writing the first compressed data to the at least one memory module;

the decompression engine included on the at least one memory module decompressing the first compressed data to form the first data;

the data movement engine transferring the first data to the nonvolatile memory.

17. The method of claim 1, wherein the compression engine comprises an input buffer and an output buffer;

wherein writing the first data to the at least one memory module comprises writing the first data to the input buffer;

wherein the compression engine stores the first compressed data in the output buffer; and wherein reading the first compressed data from the at least one memory module comprises reading the first compressed data from the output buffer.

18. The method of claim 1, further comprising:

creating one or more commands which specify compression of the first data;

the data movement engine executing the one or more commands, wherein said executing comprises the data movement engine performing said steps of reading and said steps of writing.

19. The method of claim 18, wherein said creating comprises creating the one or more commands in the system memory.

20. The method of claim 18, wherein said creating comprises the CPU creating the one or more commands in response to software execution.

21. The method of claim 18, wherein each of the one or more commands comprises at least one source address of the first data and at least one destination address 22. The method of claim 18, wherein the one or more commands comprise a plurality of commands.

23. The method of claim 1, wherein the system further includes a virtual memory manager (VMM), wherein the method further comprises:

the VMM selecting the first data for removal from the system memory;

wherein said reading the first data from the system memory, said writing the first data to the at least one memory module, the compression engine compressing the first data to form the first compressed data, said reading the first compressed data from the at least one memory module, and said writing the first compressed data to the first compressed portion of the system memory are performed in response to the VMM selecting the first data for removal from the system memory.

24. The method of claim 23, wherein said reading the first data from the system memory, said writing the first data to the at least one memory module, the compression engine compressing the first data to form the first compressed data, said reading the first compressed data from the at least one memory module, and said writing the first compressed data to the first compressed portion of the system memory occur invisibly to the VMM.

25. The method of claim 23, wherein the first data resides in a first section of system memory, the method further comprising:

the VMM releasing the first section of system memory for reuse after said reading the first data from the system memory.

26. The method of claim 23, wherein the first data in the system memory is clean, and wherein the VMM selecting the first data to be removed from the system memory includes:

the VMM invalidating the first data in the system memory.

27. The method of claim 23, wherein the system further includes a nonvolatile memory, wherein the first data in the system memory is dirty, and wherein the VMM selecting the first data to be removed from the system memory includes:

the VMM generating a writeback of the first data from the system memory to the nonvolatile memory.

28. The method of claim 1, wherein the system further includes a driver for managing the data movement engine; and wherein said reading the first data from the system memory, said writing the first data to the at least one memory module, said reading the first compressed data from the at least one memory module, and said writing the first compressed data to the first compressed portion of the system memory are performed in response to commands generated by the driver.

29. The method of claim 1, wherein the system further includes a virtual memory manager (VMM), a compressed memory manager for managing the first compressed portion of the system memory, and a driver for managing the data movement engine;

wherein the method further comprises:

the VMM selecting the first data for removal from the system memory;

the compressed memory manager generating a write request to the driver in response to the VMM selecting the first data for removal from the system memory; and the driver generating one or more command blocks to instruct the data movement engine to perform said reading the first data from the system memory, said writing the first data to the at least one memory module, said reading the first compressed data from the at least one memory module, and said writing the first compressed data to the first compressed portion of the system memory.

30. The method of claim 29, wherein the each of the one or more command blocks includes a source location of the first data in the system memory and a destination location for the first compressed data in the first compressed portion of the system memory;

wherein the data movement engine uses the source location during said reading the first data from the system memory; and wherein the data movement engine uses the destination location during said writing the first compressed data to the first compressed portion of the system memory.

31. The method of claim 1, further comprising:

comparing a size of the first compressed data to a size of the first data; and wherein the data movement engine writing the first compressed data to the first compressed portion of the system memory is not performed in response to the size of the first compressed data being greater than or equal to the size of the first data.

32. The method of claim 31, further comprising:
the data movement engine writing the first data to the first compressed portion of the system memory in response to the size of the first compressed data being greater than or equal to the size of the first data.

33. The method of claim 32, further comprising:
the data movement engine reading the first data from the first compressed portion of the system memory; and
the data movement engine writing the first data to the system memory.

34. The method of claim 1,
wherein the first data comprises symbols;
wherein the compression engine compressing the first data includes:
the compression engine analyzing and compressing a plurality of symbols from the first data in parallel to form the first compressed data.

35. The method of claim 34,
wherein the compression engine compressing the first data includes:
the compression engine comparing each of a plurality of symbols with each of a plurality of entries in a history table concurrently.

36. The method of claim 1, wherein the system memory comprises a plurality of compressed portions, the method further comprising:
the data movement engine reading a second data from the system memory;
the data movement engine writing the second data to the at least one memory module;
the compression engine included on the at least one memory module compressing the second data to form a second compressed data;
the data movement engine reading the second compressed data from the at least one memory module; and
the data movement engine writing the second compressed data to a second compressed portion of the system memory.

37. The method of claim 1, further comprising:
calculating a usage rate of the first compressed portion of the system memory;
increasing the size of the first compressed portion of the system memory in response to the usage rate of the first compressed portion of the system memory being below a low usage threshold; and
decreasing the size of the first compressed portion of the system memory in response to the usage rate of the first compressed portion of the system memory being above a high usage threshold.

38. The method of claim 1, wherein at least one memory module includes a decompression engine, the method further comprising:
the data movement engine reading the first compressed data from the first compressed portion of the system memory;
the data movement engine writing the first compressed data to the at least one memory module;
the decompression engine included on the at least one memory module decompressing the first compressed data to form the first data;
the data movement engine reading the first data from the at least one memory module; and
the data movement engine writing the first data to the system memory.

39. The method of claim 38,
wherein the decompression engine comprises an input buffer and an output buffer;
wherein the data movement engine writing the first compressed data to the at least one memory module comprises the data movement engine writing the first compressed data to the input buffer;
wherein the decompression engine stores the first data in the output buffer; and
wherein the data movement engine reading the first data from the at least one memory module comprises the data movement engine reading the first data from the output buffer.

40. The method of claim 38, wherein the system further includes a virtual memory manager (VMM), wherein the method further comprises:
the VMM requesting the first data to be copied to the system memory;
wherein said reading the first compressed data from the first compressed portion of the system memory, said writing the first compressed data to the at least one memory module, the decompression engine decompressing the first compressed data to form the first data, said reading the first data from the at least one memory module, and said writing the first data to the system memory are performed in response to the VMM requesting the first data to be copied to the system memory.

41. The method of claim 40,
wherein said reading the first compressed data from the first compressed portion of the system memory, said writing the first compressed data to the at least one memory module, the decompression engine decompressing the first compressed data to form the first data, said reading the first data from the at least one memory module, and said writing the first data to the system memory occur invisibly to the VMM.

42. The method of claim 38,
wherein the system further includes a driver for managing the data movement engine; and
wherein said reading the first compressed data from the first compressed portion of the system memory, said writing the first compressed data to the at least one memory module, said reading the first data from the at least one memory module, and said writing the first data to the system memory are performed by the data movement engine in response to commands created by the driver.

43. The method of claim 38,
wherein the system further includes a virtual memory manager (VMM), a compressed memory manager for managing the first compressed portion of the system memory, and a driver for managing the data movement engine;
wherein the method further comprises:
the VMM requesting the first data to be copied to the system memory;
the compressed memory manager generating a read request to the driver in response to the VMM requesting the first data to be copied to the system memory; and
the driver generating one or more command blocks to instruct the data movement engine to perform said reading the first compressed data from the first compressed portion of the system memory, said writing the first compressed data to the at least one memory module, said reading the first data from the at least one memory module, and said writing the first data to the system memory in response to said receiving the read request.

44. The method of claim 43,
wherein each of the one or more command blocks includes a source location of the first compressed data in the first compressed portion of the system memory and a destination location for the first data in the system memory;
wherein the data movement engine uses the source location during said reading the first compressed data from the first compressed portion of the system memory; and
wherein the data movement engine uses the destination location during said writing the first data to the system memory.

45. The method of claim 38, further comprising:
removing the first compressed data from the first compressed portion of the system memory after said reading the first compressed data from the first compressed portion of the system memory.

46. The method of claim 38,
wherein the first compressed data comprises tokens each describing one or more symbols in the first data;
wherein the decompression engine decompressing the first compressed data to form the first data includes:
the decompression engine analyzing and decompressing a plurality of tokens from the first compressed data in parallel to form the first data.

47. The method of claim 1, wherein the system further includes a nonvolatile memory and a virtual memory manager (VMM), the method further comprising:
the VMM generating a request for a second data to be loaded into system memory;
receiving said request for the second data;
examining the first compressed portion of the system memory for the second data;
the data movement engine requesting the second data from the nonvolatile memory in response to the second data not being found in the first compressed portion of the system memory;
the data movement engine receiving the second data from the nonvolatile memory; and
the data movement engine writing the second data to the system memory.

48. The method of claim 47, further comprising:
the data movement engine writing the second data to the at least one memory module;
the compression engine included on the at least one memory module compressing the second data to form a second compressed data;
the data movement engine reading the second compressed data from the at least one memory module; and
the data movement engine writing the second compressed data to the first compressed portion of the system memory.

49. The method of claim 48, further comprising:
the data movement engine requesting third data from the nonvolatile memory in response to said request for the second data;
the data movement engine receiving the third data from the nonvolatile memory;
the data movement engine writing the third data to the at least one memory module;

the compression engine included on the at least one memory module compressing the third data to form a third compressed data;
the data movement engine reading the third compressed data from the at least one memory module; and
the data movement engine writing the third compressed data to the first compressed portion of the system memory.

50. The method of claim 1, wherein the at least one memory module includes a decompression engine, wherein the-system further includes a nonvolatile memory and a virtual memory manager (VMM), the method further comprising:
the VMM generating a request for a second data to be loaded into system memory;
receiving said request for the second data;
examining the first compressed portion of the system memory for the second data;
the data movement engine requesting the second data from the nonvolatile memory in response to the second data not being found in the first compressed portion of the system memory;
the data movement engine receiving second compressed data from the nonvolatile memory in response to said requesting the second data;
the data movement engine writing the second compressed data to the at least one memory module;
the decompression engine included on the at least one memory module decompressing the first data to form the second data;
the data movement engine reading the second data from the at least one memory module; and
the data movement engine writing the second data to the system memory.

51. The method of claim 50, further comprising:
writing the second compressed data to the first compressed portion of the system memory.

52. The method of claim 50, further comprising:
the data movement engine requesting a third data from the nonvolatile memory in response to said request for the second data;
the data movement engine receiving a third compressed data from a compressed portion of the nonvolatile memory in response to said requesting the third data; and
the data movement engine writing the third compressed data to the first compressed portion of the system memory.

53. The method of claim 1, wherein the at least one memory module includes a decompression engine, wherein the system memory comprises a plurality of compressed portions, the method further comprising:
the data movement engine reading a second compressed data from a second compressed portion of the system memory;
the data movement engine writing the second compressed data to the at least one memory module;
the decompression engine included on the at least one memory module decompressing the second compressed data to form a second data;
the data movement engine reading the second data from the at least one memory module; and
the data movement engine writing the second data to the system memory.

54. The method of claim 1, wherein the system includes a memory controller coupled between the CPU and the memory module, wherein the memory controller includes the data movement engine.

55. A method for managing memory in a system including a CPU, a data movement engine (DME), and one or more memory modules comprising system memory, wherein at least one memory module includes a compression engine, the method comprising:

creating one or more commands which specify compression of first data;

the data movement engine executing the one or more commands, wherein said executing comprises:
the data movement engine reading the first data from the system memory;
the data movement engine writing the first data to the at least one memory module;
the compression engine included on the at least one memory module compressing the first data to form a first compressed data;
the data movement engine reading the first compressed data from the at least one memory module; and
the data movement engine writing the first compressed data to a first compressed portion of the system memory.

56. The method of claim 55, wherein said creating comprises creating the one or more commands in the system memory.

57. A method for managing memory in a system including a CPU, a data movement engine (DME), and one or more memory modules comprising system memory, wherein at least one memory module includes a compression engine, the method comprising:

the data movement engine generating a request for first data from the system memory;

the compression engine included on the at least one memory module compressing the first data to form a first compressed data;

the data movement engine receiving the first compressed data;

the data movement engine writing the first compressed data to a first compressed portion of the system memory.

58. A method for managing memory in a system including a CPU, a data movement engine (DME), and one or more memory modules comprising system memory, wherein at least one memory module includes a compression engine, the method comprising:

the data movement engine reading first data from the system memory;

the data movement engine writing the first data to the at least one memory module;

the compression engine included on the at least one memory module compressing the first data to form a first compressed data; and storing the first compressed data in a first compressed portion of the system memory.

59. A method for managing memory in a system including a CPU, a data movement engine (DME), and system memory, wherein system also includes a compression engine, the method comprising:

the data movement engine reading first data from the system memory;

the data movement engine writing the first data to the compression engine;

the compression engine compressing the first data to form a first compressed data;

the data movement engine reading the first compressed data from the compression engine; and the data movement engine writing the first compressed data to the system memory.

60. The method of claim 59, wherein the compression engine is comprised on one or more memory modules in the system memory.

61. The method of claim 59, wherein the system includes a memory controller coupled between the CPU and the system memory, wherein the compression engine is comprised in a memory controller coupled to the system memory.

62. A method for managing memory in a system including a CPU, a data movement engine (DME), and one or more memory modules comprising system memory, wherein at least one memory module includes a decompression engine, the method comprising:

the data movement engine reading the first compressed data from the first compressed portion of the system memory;

the data movement engine writing the first compressed data to the at least one memory module;

the decompression engine included on the at least one memory module decompressing the first compressed data to form the first data;

the data movement engine reading the first data from the at least one memory module; and the data movement engine writing the first data to the system memory.

63. A method for managing memory in a system including a CPU, a data movement engine (DME), and a system memory, wherein the system includes a decompression engine, the method comprising:

the data movement engine reading the first compressed data from the first compressed portion of the system memory;

the data movement engine writing the first compressed data to the decompression engine;

the decompression engine decompressing the first compressed data to form the first data;

the data movement engine reading the first data from the decompression engine; and the data movement engine writing the first data to the system memory.

* * * * *

UNITED STATES PATENT AND TRADEMARK OFFICE
CERTIFICATE OF CORRECTION

PATENT NO. : 7,089,391 B2  
APPLICATION NO. : 10/227607  
DATED : August 8, 2006  
INVENTOR(S) : Peter D. Geiger, Manuel J. Alvarez, II and Thomas A. Dye It is certified that error appears in the above-identified patent and that said Letters Patent is hereby corrected as shown below:

On Title Page in Section 60, "Related U.S. Application Data", after "2001" and before the ".", please insert --and is a continuation-in-part of U.S. patent application Serial No. 09/550,380 filed April 14, 2000.--

Signed and Sealed this

First Day of May, 2007

JON W. DUDAS  
*Director of the United States Patent and Trademark Office*